United States Patent
Inoue et al.

(10) Patent No.: US 7,221,666 B2
(45) Date of Patent: *May 22, 2007

(54) MOBILE COMPUTER COMMUNICATION SCHEME SUPPORTING MOVING AMONG NETWORKS OF DIFFERENT ADDRESS SYSTEMS

(75) Inventors: Atsushi Inoue, Kanagawa (JP); Yoshinari Kumaki, Kanagawa (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 1059 days.

This patent is subject to a terminal disclaimer.

(21) Appl. No.: 10/188,029

(22) Filed: Jul. 3, 2002

(65) Prior Publication Data

US 2002/0191576 A1 Dec. 19, 2002

Related U.S. Application Data

(63) Continuation of application No. 09/335,035, filed on Jun. 16, 1999, now Pat. No. 6,515,974.

(30) Foreign Application Priority Data

Jun. 16, 1998 (JP) .................................. 10/169040

(51) Int. Cl.
*H04Q 7/24* (2006.01)
*H04Q 7/00* (2006.01)
*H04Q 7/20* (2006.01)

(52) U.S. Cl. .................. 370/338; 370/331; 455/433; 455/436

(58) Field of Classification Search ............... None
See application file for complete search history.

(56) References Cited

U.S. PATENT DOCUMENTS 5,442,633 A    8/1995  Perkins et al.
5,517,618 A *  5/1996  Wada et al. ............. 370/349
5,793,762 A *  8/1998  Penners et al. .......... 370/389
6,137,791 A   10/2000  Frid et al.
6,144,671 A * 11/2000  Perinpanathan et al. ... 370/409
6,163,843 A   12/2000  Inoue et al.
6,167,513 A   12/2000  Inoue et al.
6,195,705 B1   2/2001  Leung
6,396,828 B1 *  5/2002  Liu ....................... 370/352
6,496,704 B2 * 12/2002  Yuan ...................... 370/338
6,515,974 B1 *  2/2003  Inoue et al. ............. 370/331
6,535,493 B1 *  3/2003  Lee et al. ................ 370/329

OTHER PUBLICATIONS

Chikarmane V., Network support for Mobile Hosts in a TCP/IP Internetwork, Aug. 1995, Citeseer, 1-126.*

* cited by examiner

*Primary Examiner*—Steven Nguyen
(74) *Attorney, Agent, or Firm*—Foley & Lardner LLP

(57) ABSTRACT

A communication scheme for supporting data transfer to a visited site of a mobile terminal which moves across a private network operated by a private address system and an Internet operated by a global address system is disclosed. When the mobile terminal has moved from the first network to the second network, packets destined to an original home address of the mobile terminal on the first subnet are transferred from the first router device in the first subnet by setting an address of the first interface of a packet relay device as a care-of address of the mobile terminal. Then, the packets received by the packet relay device from the first router device at the first interface are transferred to the second router device in the second subnet through the second interface of the packet relay device, and the packets received by the second router device from the packet relay device are transferred to a current location address of the mobile terminal.

5 Claims, 19 Drawing Sheets

MOBILE COMPUTER COMMUNICATION SCHEME SUPPORTING MOVING AMONG NETWORKS OF DIFFERENT ADDRESS SYSTEMS

This application is a continuation of application Ser. No. 09/335,035 filed Jun. 16, 1999 now U.S. Pat. No. 6,515,974.

BACKGROUND OF THE INVENTION

1. Field of the Invention

The present invention relates to a communication scheme for supporting data transfer to a visited site of a mobile terminal which moves across a private network operated by a private address system and an Internet operated by a global address system.

2. Description of the Background Art

A router device is used in connecting between LANs, and plays a role of transferring data packets (datagrams) from one LAN to the other LAN. Each data packet contains a description of its source and final destination network layer addresses (such as IP addresses in the case of IP, for example) in addition to communication data to be transferred, and the router device determines an output interface (port number) and a next transfer target node (a host that is either a router device or a communication terminal) of each data packet according to its address information.

Here, a routing by the router device will be described for an exemplary case of transmitting IP packets from a terminal A to a terminal B on a network.

An IP packet sent out from the terminal A is routed within the Internet according to an IP address written in its packet header, and transmitted up to a subnet to which the terminal B belongs. At that point, whenever a router device within the Internet is passed through, an IP forwarding processing in a sequence of: reception of a datalink layer packet→conversion into an IP packet→processing of an IP header Information, etc. and an output target determination→conversion into a datalink layer packet→transmission of a datalink layer packet, is carried out with respect to an IP packet transmitted from the terminal A. Once it reaches to a router device of the final subnet, a logical address to physical address conversion is carried out by ARP (Address Resolution Protocol) (by obtaining a MAC address from an IP address, for example), and an IP packet is converted into a datalink layer packet by attaching a datalink layer header information such as MAC address, and this datalink layer packet is transmitted to the terminal B.

On the other hand, a technique for accommodating mobile terminals into the Internet-like network has been studied and developed. As one such mobile access technique, a scheme utilizing Mobile IP is known.

Mobile IP deals with the case where a user carrying a mobile terminal communicates while moving over the IP network across a plurality of subnets. In the case of communicating while moving over the IP network where the network address of the mobile terminal changes as the location of the terminal changes, there is a need to provide a scheme for managing a location of the terminal and transferring communication contents properly, and Mobile IP is a scheme that is proposed in order to fulfill that need. Mobile IP is a technique which makes the mobile terminal to appear to the other terminals as if it is connected at a location where it is normally expected to be located (a home address of a home network), regardless of a location at which the mobile terminal is connected on the network. Mobile IP has been promoted to RFC level by IETF in October, 1996.

In the following, the basic operation of Mobile IP will be described with reference to FIG. 1, which shows an exemplary network configuration in which a first network 100-1 and a second network 100-2 are connected through Internet 100-3. Here, each of these networks is assumed to be operated using global addresses.

In Mobile IP, a network (home network) 100-1 to which a mobile terminal (mobile host: MH) 103 is normally connected has a router called home agent (HA) 105 located therein. The mobile terminal 103 is assigned with a home address at the home network, which is managed by the home agent 105. Here, for the sake of explanation, it is assumed that the home address of the mobile terminal 103 is "10.2" and the address of its home agent 105 is "10.1".

Next, suppose that the mobile terminal 103 moves and makes a connection at a visited site network 100-2. The visited site network 100-2 has a router called foreign agent (FA) 106 located therein. After moving, the mobile terminal 103 receives packets destined to the own node via this foreign agent 106. Here, for the sake of explanation, it is assumed that the IP address of the foreign agent 106 is "20.1". In this case, the address "20.1" of the foreign agent 106 will be used as the current location address (called care-of address) of the mobile terminal 103.

In order to notify the current location of the own node, the mobile terminal 103 notifies the IP address "20.1" of the current location from the visited site to the home agent 105. Upon receiving this notification, the home agent 105 manages a correspondence between the home address "10.2" and the current location address "20.1" of the mobile terminal 103.

Now, Mobile IP assumes that there exists a correspondent host who does not know that the mobile terminal 103 has moved. This correspondent host (CH) 109 that tries to communicate with the mobile terminal 103 does not know that the mobile terminal 103 has moved so that it transmits packets destined to the home address "10.2". However, the mobile terminal 103 is currently absent from the home network. Hence, the home agent 105 which manages this mobile terminal 103 intercepts (receives as a proxy) a packet destined to the home address "10.2", and transfers it by encapsulating it into an IP packet destined to the current location address "20.1" that is registered in advance. The foreign agent 106 that is located at the address "20.1" takes out this packet from the encapsulated packet that is transferred thereto, and delivers it to the visiting mobile terminal 103 at the datalink layer. By such a mechanism, the mobile terminal 103 can receive a packet that would have been received by the own node at its original home network 100-1, even at its visited site.

In the opposite case where the mobile terminal 103 returns a packet to the correspondent host 109 from its current location, an IP packet is sent to the correspondent host 109 directly without going through the home agent 105. At that point, the home address "10.2" is used as a source address to be attached to that packet, rather than the current location (care-of) address "20.1". In this way, it appears as if the mobile terminal 103 is continually connected to its home network, from the correspondent host 109, so that the influence of the moving can be eliminated entirely.

As described above, in Mobile IP, each node (correspondent host) on the network can access the mobile terminal 103 regardless of a location on the network at which the mobile terminal 103 is connected, by using the home address of the home network 103.

Now, in the Mobile IP scheme, a protocol is designed by assuming only a case where the mobile terminal moves within a single address space. That is, it has been assumed that the current location registration message (which is also referred to as the mobility registration message) from the visited site can reach the home agent of the home network without failure.

However, nowadays, in the case where a large organization makes Internet connections, it is rather rare to have global IP addresses allocated to all the nodes within the organization because of the shortage of IP addresses, and usually private addresses (see RFC 1597) are used for operation within the organization and the address conversion to global addresses are carried out at a time of communications with the external.

Thus, in such a case, Mobile IP can be utilized only within a range where the mobile terminal moves within a single address space. In other words, there has been a problem that Mobile IP cannot support those services in which the mobile terminal is allowed to move across networks operated by mutually different address systems.

FIG. 2 shows an exemplary case where Mobile IP cannot be utilized, which is a network model in which a communication service provider offers a service using mobile terminals that are capable of making Internet accesses. FIG. 2 shows an exemplary network configuration in which a private network 101 operated by a private address system and a global Internet 102-2 operated by a global address system are connected through Internet 102-1 operated by a global address system.

The number of global addresses that are allocated to one communication service provider is limited, so that communications using private addresses will be carried out within the private network 101 operated by the communication service provider. This service can possibly be required to support not only data transfer in the case where the mobile terminal 103 moved from the home network 101a to another subnet 101b and accesses to servers 201 and 202 of the private network 101 by the mobile terminal 103, but also accesses to a server 203 which is generally connected to the global Internet 102-1 from within the private network 101 by using a network address translation device 104 having a network address translation (NAT) function, and direct communications by the mobile terminal 103 that has moved to the global Internet 102-2 in a global region.

However, when the mobile terminal 103 which has its home network in a private region moves into a global region, Mobile IP cannot be used. On the contrary, when the mobile terminal which has its home network in a global region moves into a private region, Mobile IP also cannot be used.

In such a network model, it is not sufficient to realize a simple packet exchange between the private network and the global Internet, and it is also necessary to maintain currently carried out communications by utilizing the properties of Mobile IP even in a case where the mobile terminal that had been connected to the private network shortly before has now moved to the global Internet or vise versa.

In order to realize that, it is necessary to carry out the routing control of communication packets by recognizing the current location to which the mobile terminal has moved, comprehending a relative relationship with respect to a location to which the mobile terminal had been connected shortly before, and carrying out the necessary global to private address translation via the entrance of the private network.

As described above, in general, in order to support the mobile terminal which moves across the private network operated by the communication service provider and the global Internet by utilizing the Mobile IP scheme, it is necessary to provide a scheme for controlling a location to be regarded as the current home network according to the current location and the immediately previous location of the mobile terminal and a way of commanding transfer of packets to the current location with respect to the immediately previous home network, and for realizing the routing control up to the final destination by receiving the transmitted or transferred packet at the border between the private network and the global network and converting it into appropriate format.

Thus, in the case of supporting a service in which the mobile terminal can move across networks operated by mutually different address systems, the conventionally known mobile access technique for Internet-like network such as the usual mobile management by Mobile IP in a single address space is insufficient, and there is a need for a mechanism which can properly account for two types of address spaces such as the private network operated by the private address system managed by the communication service provider and the general global Internet, and realize not only the packet exchange across their border but also the proper routing control of packets up to the current location even when the mobile terminal moves across their border.

SUMMARY OF THE INVENTION

It is therefore an object of the present invention to provide a communication scheme for the mobile terminal that moves across a plurality of networks operated by mutually different address systems, which is capable of supporting the moving by the mobile terminal within each network and transferring data packets having the former address of the mobile terminal as their destination to the current location of the mobile terminal even when the mobile terminal moves across these networks.

According to one aspect of the present invention there is provided a communication system for supporting data packet transfer with respect to mobile terminals capable of carrying out communications while moving among networks, in a first network and a second network which are operated by mutually different address systems and which are capable of accommodating the mobile terminals, the communication system comprising: a packet relay device having a first interface connected with the first network and a second interface connected with the second network; a first router device provided at a first subnet in the first network, having a function for transferring packets destined to a home address of each mobile terminal belonging to the first subnet to a care-of address of each mobile terminal; and a second router device provided at a second subnet in the second network; wherein when a mobile terminal has moved from the first network to the second network, the first router device transfers packets destined to an original home address on the first subnet of the mobile terminal by setting an address of the first interface of the packet relay device as a care-of address of the mobile terminal, the packet relay device transfers the packets received from the first router device at the first interface to the second router device through the second interface, and the second router device transfers the packets received from the packet relay device to a current location address of the mobile terminal.

According to another aspect of the present invention there is provided a method of data packet transfer in a communication system for supporting data packet transfer with respect to mobile terminals capable of carrying out communications while moving among networks, in a first network and a second network which are operated by mutually different address systems and which are capable of accommodating the mobile terminals, the communication system including a packet relay device having a first interface connected with the first network and a second interface connected with the second network, a first router device provided at a first subnet in the first network, the first router device having a function for transferring packets destined to a home address of each mobile terminal belonging to the first subnet to a care-of address of each mobile terminal, and a second router device provided at a second subnet in the second network, the method comprising the steps of: (a) when a mobile terminal has moved from the first network to the second network, transferring packets destined to an original home address of the mobile terminal on the first subnet from the first router device by setting an address of the first interface of the packet relay device as a care-of address of the mobile terminal; (b) transferring the packets received by the packet relay device from the first router device at the first interface to the second router device through the second interface; and (c) transferring the packets received by the second router device from the packet relay device to a current location address of the mobile terminal.

According to another aspect of the present invention there is provided a router device for use in a communication system for supporting data packet transfer with respect to mobile terminals capable of carrying out communications while moving among networks, in a first network and a second network which are operated by mutually different address systems and which are capable of accommodating the mobile terminals, the communication system including a packet relay device having a first interface connected with the first network and a second interface connected with the second network, the router device being provided at a subnet in the first network and comprising: a first management unit for managing an original home address on the subnet of a mobile terminal for which the subnet is an original home network; a second management unit for managing a care-of address of the mobile terminal; and a transfer unit for receiving packets destined to the original home address managed by the first management unit on behalf of the mobile terminal, and transferring the packets to the care-of address managed by the second management unit, when the mobile terminal is currently not located at the original home address, such that when the mobile terminal has moved from the first network to the second network, the router device transfers packets destined to the original home address by setting an address of the first interface of the packet relay device as the care-of address.

According to another aspect of the present invention there is provided a router device for use in a communication system for supporting data packet transfer with respect to mobile terminals capable of carrying out communications while moving among networks, in a first network and a second network which are operated by mutually different address systems and which are capable of accommodating the mobile terminals, the communication system including a packet relay device having a first interface connected with the first network and a second interface connected with the second network, the router device being provided at a subnet in the second network and comprising: a first management unit for managing a new home address on the subnet of a mobile terminal for which the subnet is a new home network; a second management unit for managing a current location address of the mobile terminal; a message transfer unit for transferring to the packet relay device a pair information on an original home address that has been allocated to the mobile terminal in the first network and the new home address of the mobile terminal transmitted from the mobile terminal and managed by the first management unit, when the mobile terminal has moved from the first network to the second network, such that the packer relay device transfers packets destined to the original home address and received at the first interface to the router device through the second interface; and a packet transfer unit for transferring the packets received from the packet relay device to the current location address of the mobile terminal managed by the second management unit.

According to another aspect of the present invention there is provided a packer relay device for use in a communication system for supporting data packet transfer with respect to mobile terminals capable of carrying out communications while moving among networks, in a first network and a second network which are operated by mutually different address systems and which are capable of accommodating the mobile terminals, the communication system including a first router device provided at a first subnet in the first network and a second router device provided at a second subnet in the second network, the packet relay device being provided between the first network and the second network and comprising: a first interface connected with the first network; a second interface connected with the second network; a message reception unit for receiving through the second interface a pair information on an original home address of a mobile terminal on the first subnet and a new home address acquired by the mobile terminal on the second subnet when the mobile terminal moves from the first network to the second network, the pair information being notified by the mobile terminal; a message analysis unit for obtaining the original home address and the new home address along with information on the first and second router devices, by analyzing the pair information received by the message reception unit; a message transmission unit for transmitting a message to the first router device through the first interface, such that the first router device transfers packets destined to the original home address to the first interface; and a packet transfer unit for transferring the packets received at the first interface to the second router device through the second interface by using the new home address, such that the second router device transfers the packets to the mobile terminal.

According to another aspect of the present invention there is provided a computer usable medium having computer readable program code means embodied therein for causing a computer to function as a router device for use in a communication system for supporting data packet transfer with respect to mobile terminals capable of carrying out communications while moving among networks, in a first network and a second network which are operated by mutually different address systems and which are capable of accommodating the mobile terminals, the communication system including a packet relay device having a first interface connected with the first network and a second interface connected with the second network, the router device being provided at a subnet in the first network and the computer readable program code means includes: first computer readable program code means for causing said computer to manage an original home address on the subnet of a mobile terminal for which the subnet is an original home network; second computer readable program code means for causing said computer to manage a care-of address of the mobile terminal; and third computer readable program code means for causing said computer to receive packets destined to the original home address managed by the first computer readable program code means on behalf of the mobile terminal, and transfer the packets to the care-of address managed by the second computer readable program code means, when the mobile terminal is currently not located at the original home address, such that when the mobile terminal has moved from the first network to the second network, the router device transfers packets destined to the original home address by setting an address of the first interface of the packet relay device as the care-of address.

According to another aspect of the present invention there is provided a computer usable medium having computer readable program code means embodied therein for causing a computer to function as a router device for use in a communication system for supporting data packet transfer with respect to mobile terminals capable of carrying out communications while moving among networks, in a first network and a second network which are operated by mutually different address systems and which are capable of accommodating the mobile terminals, the communication system including a packet relay device having a first interface connected with the first network and a second interface connected with the second network, the router device being provided at a subnet in the second network and the computer readable program code means includes: first computer readable program code means for causing said computer to manage a new home address on the subnet of a mobile terminal for which the subnet is a new home network; second computer readable program code means for causing said computer to manage a current location address of the mobile terminal; third computer readable program code means for causing said computer to transfer to the packet relay device a pair information on an original home address that has been assigned to the mobile terminal in the first network and the new home address of the mobile terminal transmitted from the mobile terminal and managed by the first computer readable program code means, when the mobile terminal has moved from the first network to the second network such that the packer relay device transfers packets destined to the original home address and received at the first interface to the router device through the second interface; and fourth computer readable program code means for causing said computer to transfer the packets received from the packet relay device to the current location address of the mobile terminal managed by the second computer readable program code means.

According to another aspect of the present invention there is provided a computer usable medium having computer readable program code means embodied therein for causing a computer to function as a packer relay device for use in a communication system for supporting data packet transfer with respect to mobile terminals capable of carrying out communications while moving among networks, in a first network and a second network which are operated by mutually different address systems and which are capable of accommodating the mobile terminals, the communication system including a first router device provided at a first subnet in the first network and a second router device provided at a second subnet in the second network, the packet relay device being provided between the first network and the second network and having a first interface connected with the first network and a second interface connected with the second network, and the computer readable program code means includes: first computer readable program code means for causing said computer to receive a pair information on an original home address of a mobile terminal on the first subnet and a new home address acquired by the mobile terminal on the second subnet when the mobile terminal moves from the first network to the second network, the pair information being notified by the mobile terminal through the second interface; second computer readable program code means for causing said computer to obtain the original home address and the new home address along with information on the first and second router devices, by analyzing the pair information received by the first computer readable program code means; third computer readable program code means for causing said computer to transmit a message to the first router device through the first interface, such that the first router device transfers packets destined to the original home address to the first interface; and fourth computer readable program code means for causing said computer to transfer the packets received at the first interface to the second router device through the second interface by using the new home address, such that the second router device transfers the packets to the mobile terminal.

Other features and advantages of the present invention will become apparent from-the following description taken in conjunction with the accompanying drawings.

DETAILED DESCRIPTION OF THE PREFERRED EMBODIMENTS

Referring now to FIG. 3 to FIG. 19, one embodiment of a communication scheme according to the present invention will be described in detail.

Figure 1:
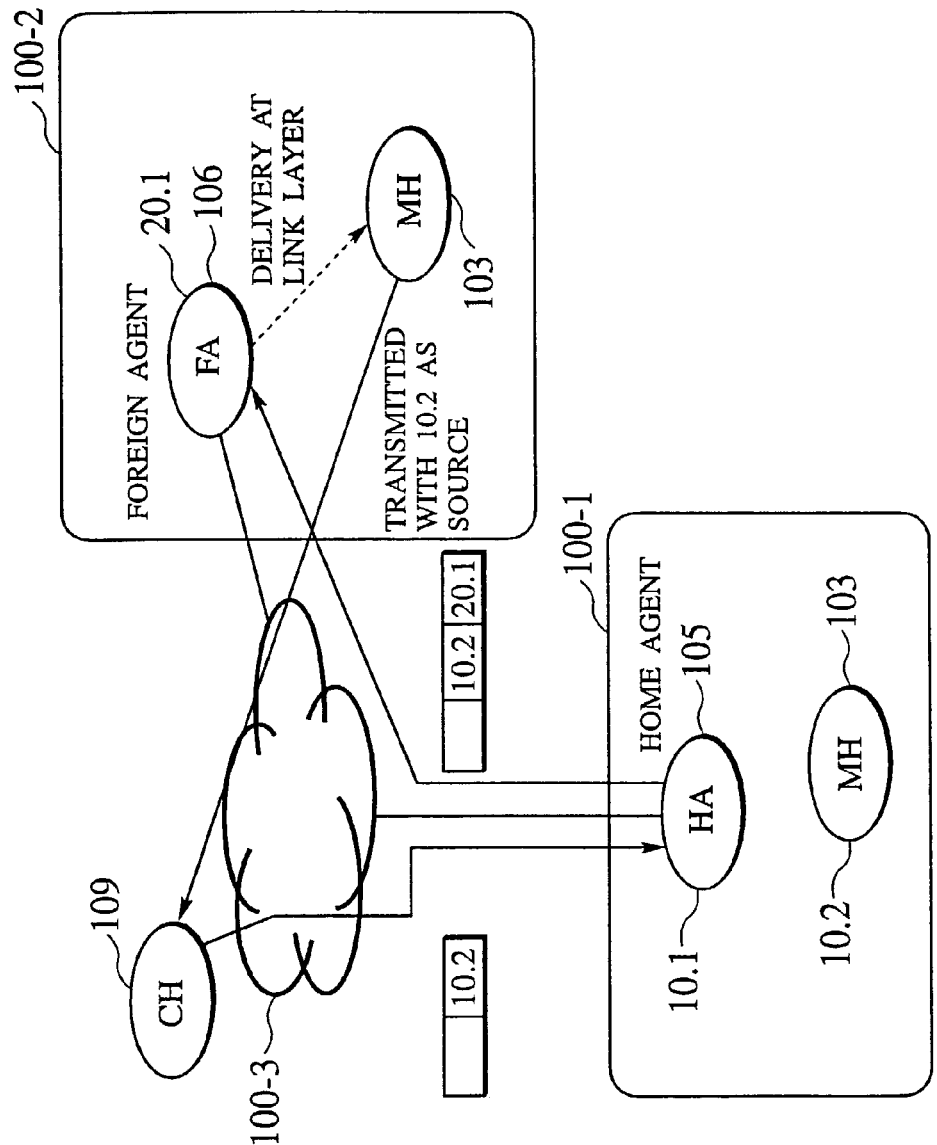
FIG. 1 is a schematic diagram of a conventional communication system for explaining a basic operation of Mobile IP.
Figure 2:
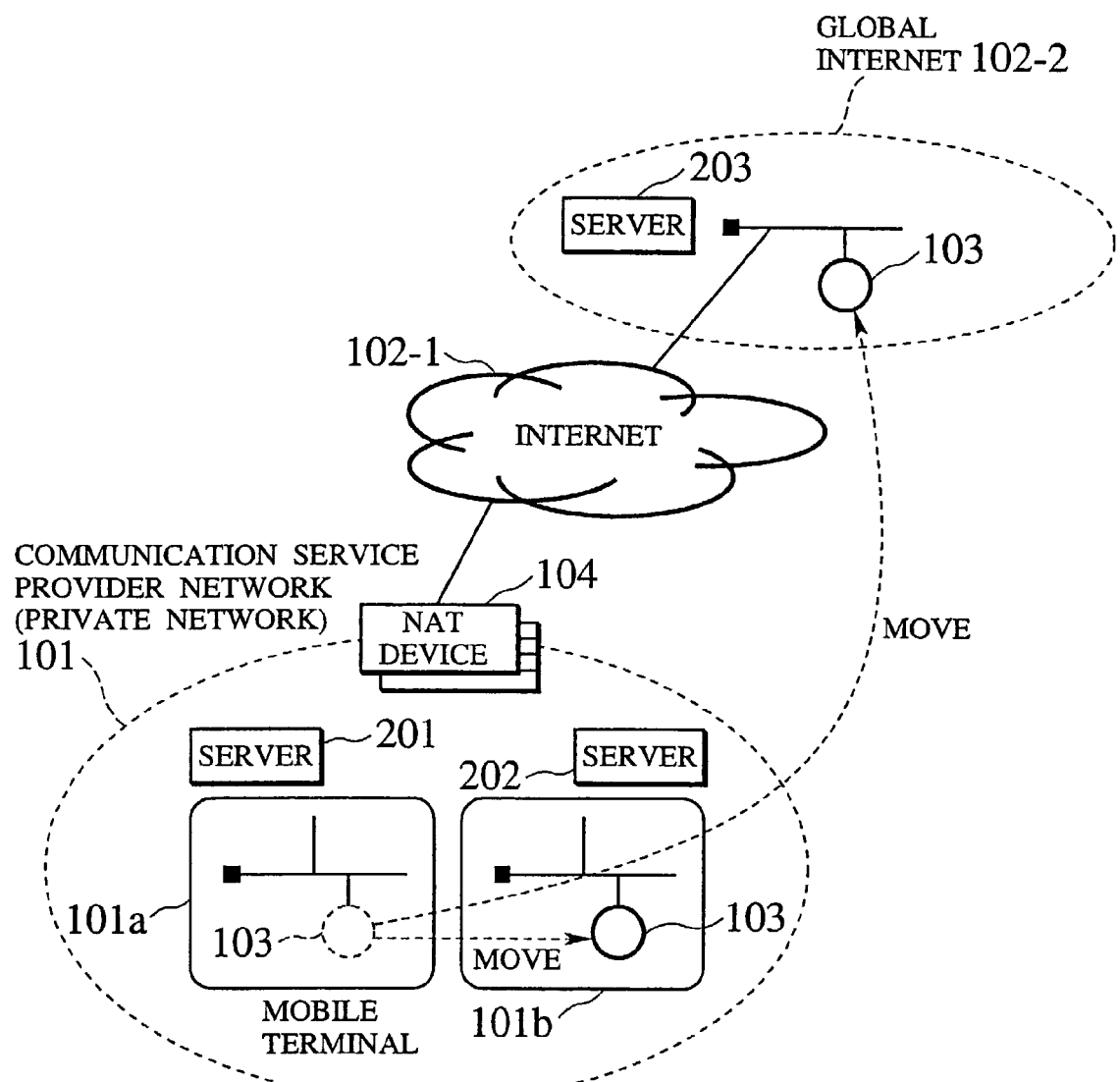
FIG. 2 is a schematic diagram of an exemplary network model in which a communication service provider provides a service using a mobile terminal which is capable of making accesses to the Internet.
Figure 3:
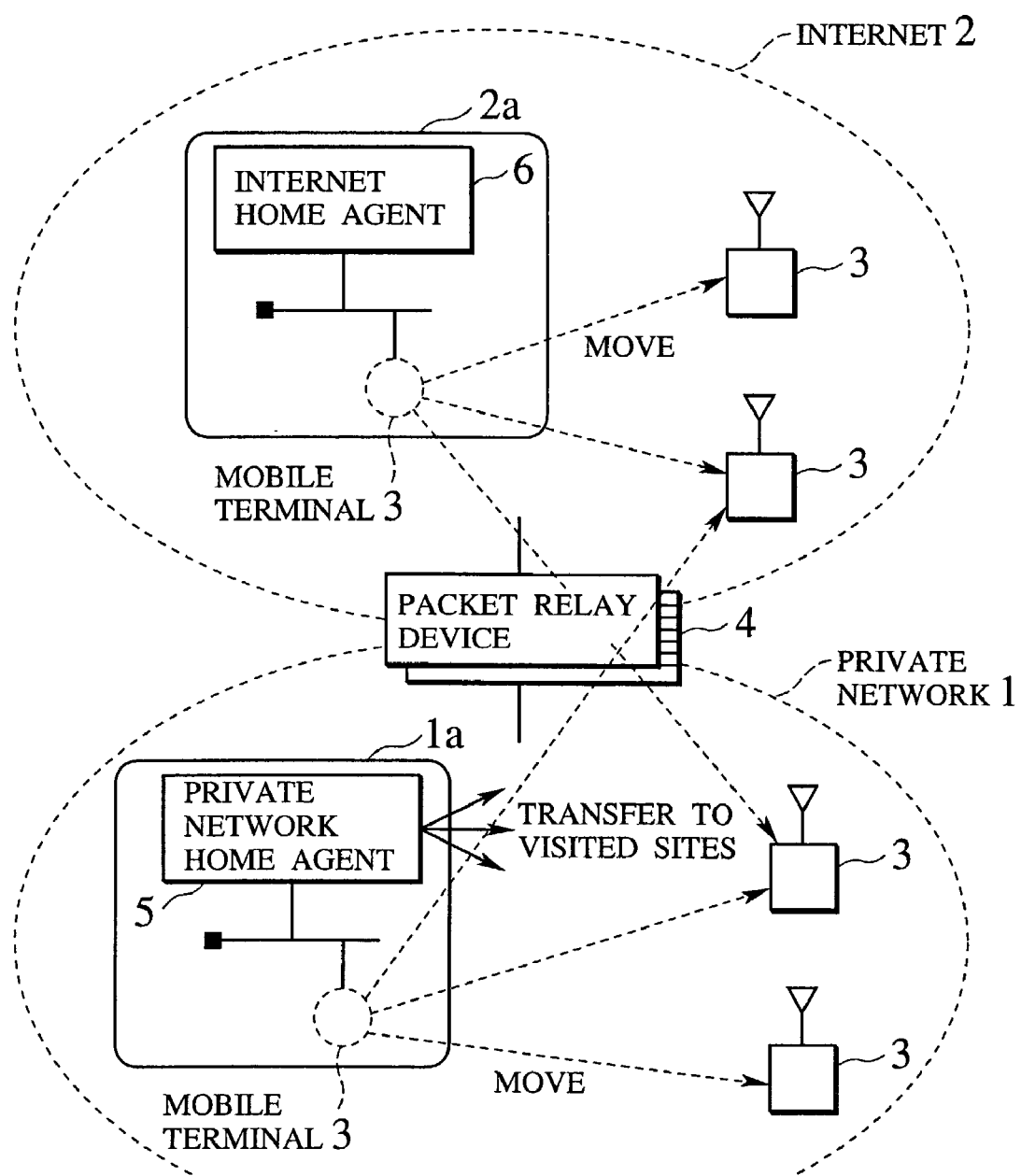
FIG. 3 is a schematic diagram showing a basic configuration of a communication system according to one embodiment of the present invention.

FIG. 3 shows a basic configuration of a network in this embodiment, which is a network formed by a private network 1 and the Internet 2 that are interconnected with each other. In the Internet 2, a global address is allocated to each node. On the other hand, the private network 1 is a network which is operated by a communication service provider, for example, and managed using private addresses internally.

A mobile terminal 3 is a node having functions that are basically similar to those of the mobile terminal in Mobile IP. The mobile terminal 3 has some subnet within the private network 1 or the Internet 2 as its home network, and carries out data communications with arbitrary correspondent host by using TCP/IP protocol while moving among both networks.

At a border between the private network 1 and the Internet 2, a packet relay device 4 equipped with two interfaces is provided. The packet relay device 4 has a first interface on the private network 1 side to which a private address is allocated, and a second interface on the Internet 2 side to which a global address is allocated. Also, the packet relay device 4 has a NAT (Network Address Translation) function for translating source and destination addresses of a packet which is routing controlled to the first interface from the private network 1 side into global addresses and relaying this packet to the Internet 2 side, as well as translating source and destination addresses of a packet which is routing controlled to the second interface from the Internet 2 side into private addresses and relaying this packet to the private network 1 side (that is, carrying out private→global address translation and global→private address translation).

On a subnet 1a within the private network 1, there is provided a private network home agent 5 which is a router for managing a movement of each mobile terminal 3 for which this subnet 1a is the home network whenever such a mobile terminal 3 moves to another subnet within the private network 1.

Similarly, on a subnet 2a within the Internet 2, there is provided an Internet home agent 6 which is a router for managing a movement of each mobile terminal 3 for which this subnet 2a is the home network whenever such a mobile terminal 3 moves to another subnet within the Internet 2.

In this case, the operation of each home agent is similar to that described in the basic specification (RFC 2002) of Mobile IP, where the home agent receives a registration message indicating a current location from the mobile terminal 3 that has moved to the visited site, and when this is accepted, the home agent transfers arrived packets that are destined to the home address of that mobile terminal 3 to the registered current location (care-of address) of that mobile terminal 3 by using the tunneling based on the encapsulation scheme such as IP-in-IP scheme (RFC 2003) or Minimal Encapsulation (RFC 2004). Note that the home address of the mobile terminal 3 is an address allocated to the mobile terminal 3 which belongs to some subnet at which the home agent is located, which functions as the domicile address of the mobile terminal 3 (even when this mobile terminal 3 moves, the other nodes transmits packets destined to this home address rather than the visited site of this mobile terminal 3).

Note that, in the present specification, a "location" refers to a location on the network, i.e., a subnet within the network to which the mobile terminal is connected. A location registration will also be referred to as a mobility registration.

Also, as described in detail below, in this embodiment, in addition to a support for the mobile terminal based on usual Mobile IP as described above, the private network home agent 5 also provides a support for a movement of the mobile terminal 3 into the Internet 2, while the Internet home agent 6 also provides a support for a movement of the mobile terminal 3 into the private network 1.

Next, the management of the home address in this embodiment will be described.

As for the home address to be allocated to the mobile terminal 3 that moves, there are various cases depending on forms of operating the mobile terminal 3.

(1) A Case Where the Mobile Terminal is Normally Connected to the Private Network of the Communication Service Provider (FIG. 4):

One possible case is where the communication service provider is the Internet service provider which allocates one private address to the mobile terminal 3 used within its private network. However, whether or not to permit a movement of the mobile terminal 3 to the Internet 2 side or not depends on the policy of the communication service provider, and there can be cases where such a movement is prohibited from a viewpoint of security or the like. In this embodiment, it is assumed the private network 1 permits such a movement to the internet 2 side.

In such a case, at the Internet 2 side, one global address to be used as the home address at the Internet 2 side is dynamically allocated to the mobile terminal 3 by DHCP (Dynamic Host Configuration Protocol) or IPCP (IP Control Protocol) of the PPP (Point-to-Point Protocol) connection, and the movement control is carried out by regarding this global address as the home address of the mobile terminal 3 at the Internet 2 side.

(2) A Case Where the Mobile Terminal is Normally Connected to the Internet (FIG. 5):

Another possible case is where the mobile terminal 3 has one global address allocated at the Internet connection point such as that of the enterprise network or ISP (Internet Service Provider) and this mobile terminal 3 comes into the private network 1 of the communication service provider. This is a case where the private network 1 is an radio accessible network and the mobile terminal 3 has the interface that is automatically switched from wire radio when the mobile terminal 3 enters into the radio zone and makes a connection to the private network 1, for example. In this case, when the mobile terminal 3 enters into the private network 1, one private address to be used as the home address within the private network 1 side is dynamically allocated to the mobile terminal 3 by DHCP (Dynamic Host Configuration Protocol).

Figure 4:
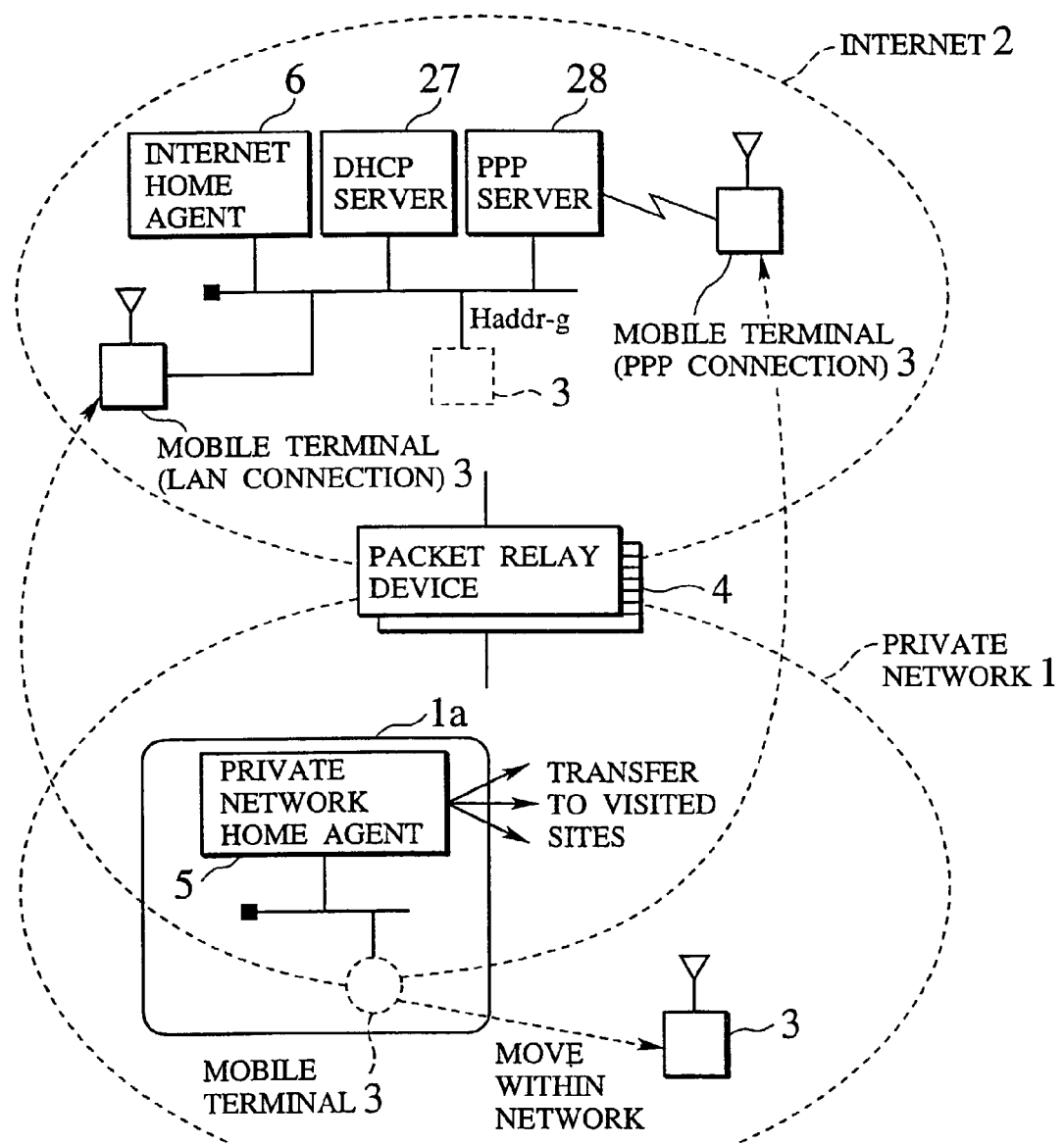
FIG. 4 is a schematic diagram of the communication system of FIG. 3 for a case where a mobile terminal is normally connected to a private network.
Figure 5:
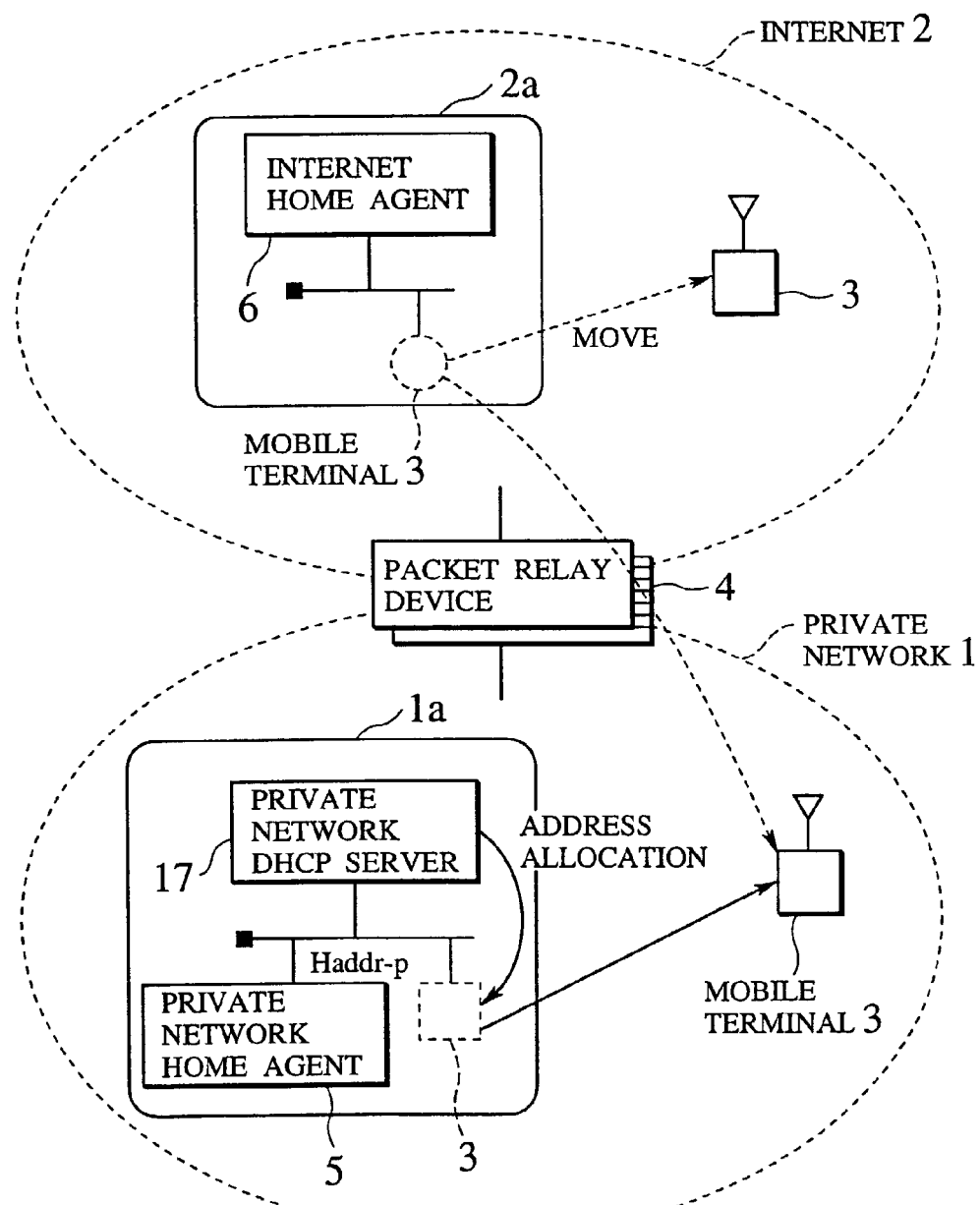
FIG. 5 is a schematic diagram of the communication system of FIG. 3 for a case where a mobile terminal is normally connected to the Internet.

In either one of the case (1) and the case (2) described above, the information on the home address dynamically allocated by DHCP or the like is notified to the home agent located within the originating network (corresponding to the original domicile of the mobile terminal) via the home agent located within the visited site, in order to maintain the correspondence of the home addresses at both the Internet 2 side and the private network 1 side, as shown in FIG. 4 and FIG. 5.

In FIG. 4, the mobile terminal 3 originally belongs to (the subnet 1a of) the private network 1, and has the private home address Haddr-p allocated. In other words, Haddr-p can be used as an identifier unique to the mobile terminal 3.

When this mobile terminal 3 moves to the Internet 2 side and the home address Haddr-g at the Internet 2 side is allocated by DHCP or IPCP, an information on a pair of this home address Haddr-g and the private network side address Haddr-p is notified to the Internet home agent (HA-g) 6. The Internet home agent (HA-g) 6 also notifies this pair information to the private network home agent (HA-p) 5 through the packet relay device 4. These message exchanges are carried out immediately after the address is allocated by DHCP or the like, rather than at a time of carrying out the registration of Mobile IP after the mobile terminal 3 decided the final visiting site. The movement management table of each home agent may be implemented to carry out the allocation of an entry at a timing of this message reception.

In FIG. 5, the mobile terminal 3 originally belongs to the Internet 2, and has the global home address Haddr-g allocated. In other words, Haddr-g can be used as an identifier unique to the mobile terminal 3.

When this mobile terminal 3 moves to the private network 1 side and the home address Haddr-p at the private network 1 side is allocated by DHCP, an information on a pair of this home address Haddr-p and the Internet side address Haddr-g is notified to the private network home agent (HA-p) 5. The private network home agent (HA-p) 5 also notifies this pair information to the Internet home agent (HA-g) 6 through the packet relay device 4. These message exchanges are carried out immediately after the address is allocated by DHCP, rather than at a time of carrying out the registration of Mobile IP after the mobile terminal 3 decided the final visiting site. The movement management table of each home agent may be implemented to carry out the allocation of an entry at a timing of this message reception.

Next, the NAT processing in this embodiment will be described.

Figure 6:
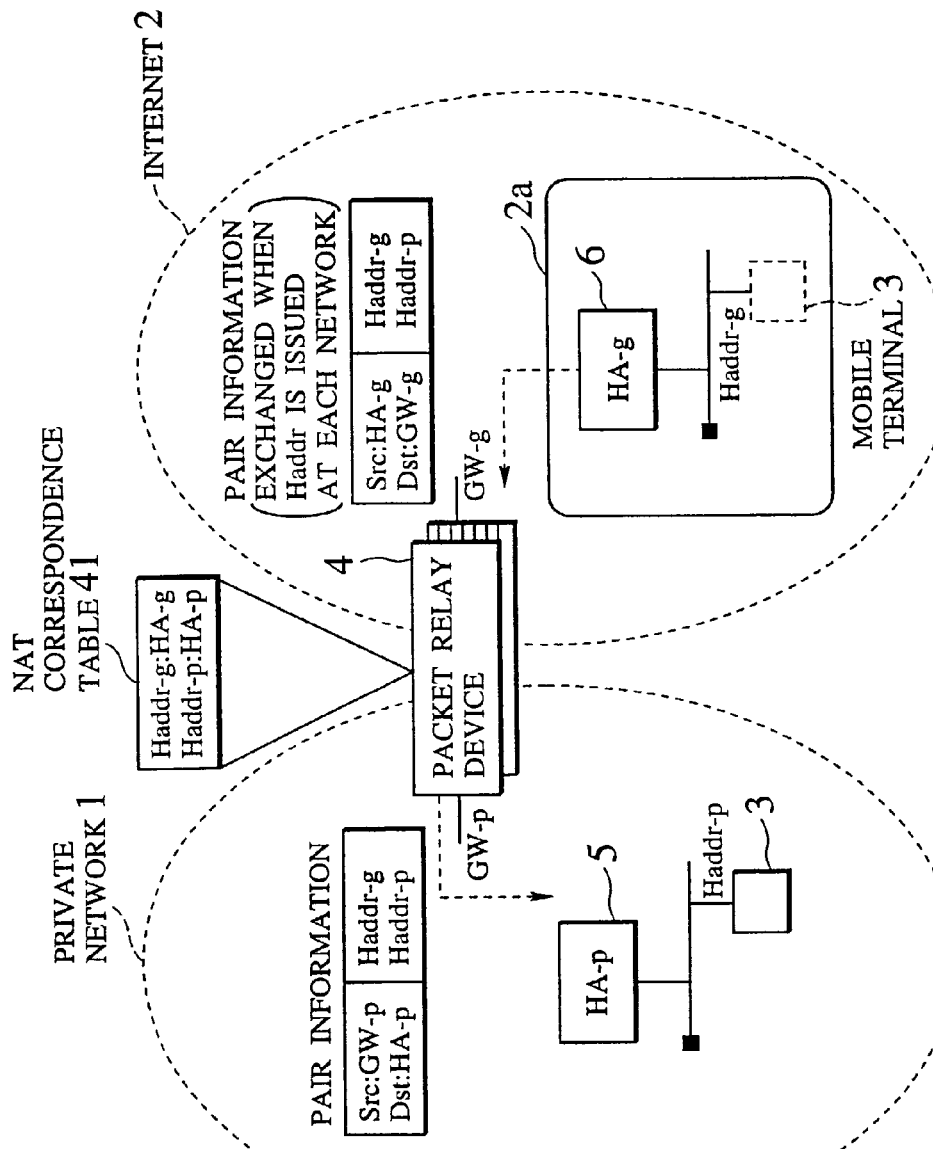
FIG. 6 is a schematic diagram of the communication system of FIG. 3 for explaining an address translation processing at a packet relay device.

In the above described message exchanges, the pair information is communicated through the packet relay device 4, but this packet relay device 4 also carries out the NAT processing so that there is a need to store the correspondence between paired addresses at a time of the initial message exchange so as to construct an information for the purpose of the address translation for subsequent packets, as shown in FIG. 6.

The functions of the NAT module to be provided at the packet relay device 4 includes the following:

A function for maintaining an address pair information comprising the pair information on the private home address Haddr-p and the global home address Haddr-g and the information on home agents for managing respective addresses, in an NAT correspondence table 41;

A function for converting a packet originating from the home agent of one network to a packet destined to the home agent of another network: and A function for carrying out the similar private⇋(global address translation according to the maintained address pair information with respect to the response packets in the opposite direction.

Thus, at a time of carrying out the above described pair information exchange for the first time, the message content is analyzed and a necessary entry of the NAT correspondence table 41 is generated. More specifically, the information on the private home address Haddr-p and the global home address Haddr-g that is contained in the packet at a time of the first pair information exchange is extracted, and the necessary address pair information is produced.

Here, the address of HA-p can be resolved either by having a static table of correspondence between each subnet and its home agent, or by-encoding HA-p address into the pair information message. In either case, when the pair information message is received by the packey relay device 4, the packet relay device 4 can forward the message toward appropriate home agent.

After the initial pair information exchange is carried out in this way, it becomes possible to carry out the packet exchange over two networks using the private/global address translation by the NAT mechanism of the packet relay device 4. For example, when a packet having the source address HA-g and the destination address GW-g is transmitted from the home network 6 on the Internet 2 side, this packet is converted into a packet having the source address GW-p and the destination address HA-p at the packet relay device 4, and reaches to the home agent 5 on the private network 1 side.

Figure 7:
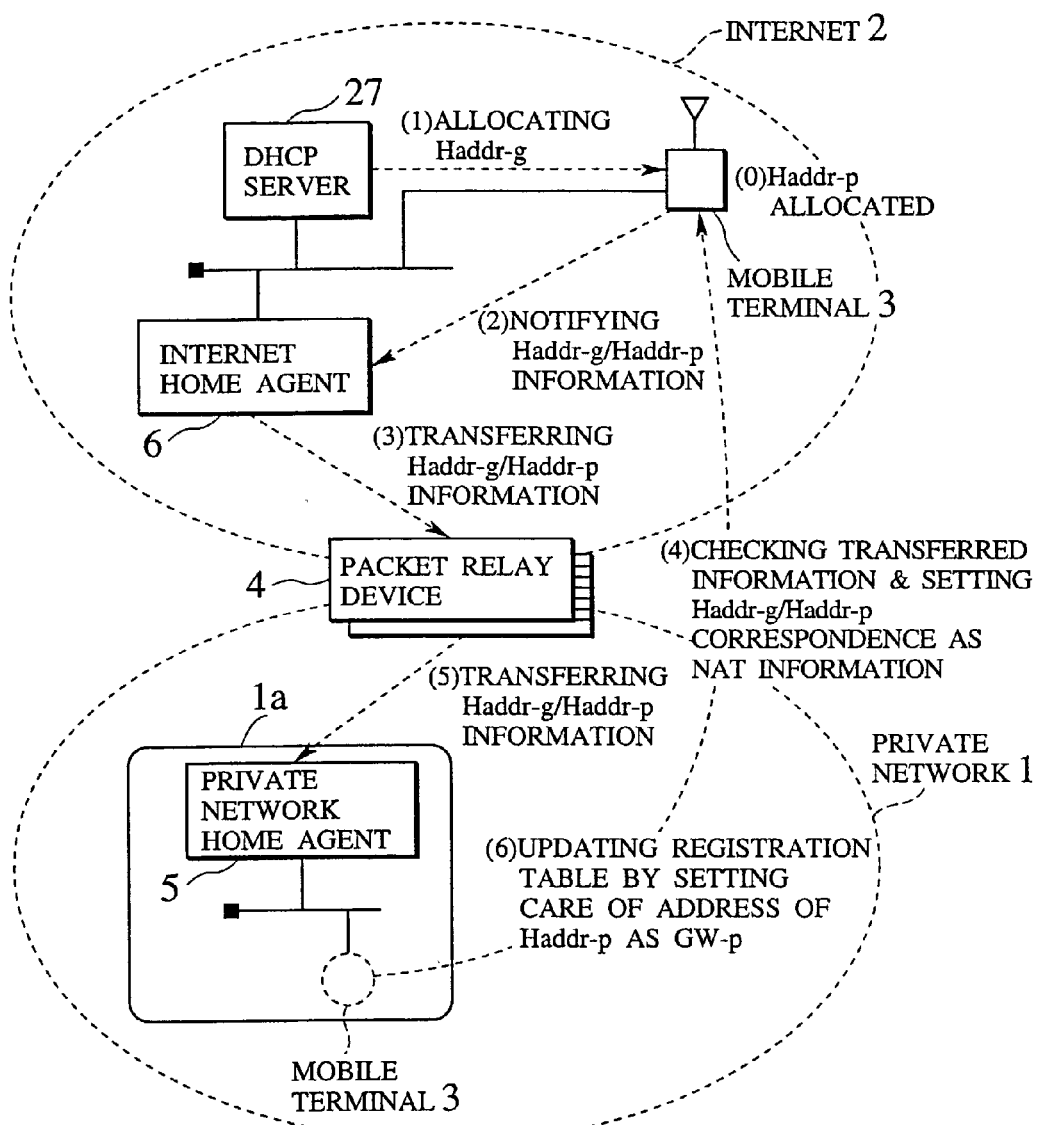
FIG. 7 is a schematic diagram of the communication system of FIG. 3 for explaining a processing from a home address allocation to an address translation information setting at a packet relay device.

FIG. 7 indicates the operations of individual constituent elements for the above described overall operations including the home address acquisition at the visited site network of the mobile terminal, the production and the transmission of the pair information, and the production of the NAT correspondence table, for an exemplary case of moving from the private network to the Internet, which include the following.

(1) The mobile terminal 3 receives the allocation of Haddr-g at (a subnet within) the Internet 2 which is the visited site.

(2) The mobile terminal 3 notifies the pair information on Haddr-p/Haddr-g to the Internet home agent 6.

(3) The Internet home agent 6 transfers the pair information on Haddr-p/Haddr-g to the packet relay device 4.

(4) The packet relay device 4 checks the transferred pair information, and maintains the correspondence of Haddr-p/Haddr-g in the NAT correspondence table 41.

(5) The packet relay device 4 transfers the pair information on Haddr-p/Haddr-g to the private network home agent 5.

(6) The private network home agent 5 updates the registration table by setting GW-p as a care-of address of the mobile terminal 3 to which Haddr-p is allocated.

The operations in the case of moving from the Internet 2 to the private network 1 is similar to the above.

Note that, in the case of managing accesses with respect to the mobile terminal 3 by DNS (Domain Name System), DNS can be controlled to produce a new DNS entry at a time of the home address acquisition at each network.

Now, in the case where the mobile terminal 3 moves within the private network 1, the care-of address acquired at the visited site is notified to the home agent 5 located in its home network (such as the subnet 1*a* of FIG. 3), and the packet transfer to the visited site is requested, as specified for the registration processing in Mobile IP (RFC 2002).

Similarly, in the case where the mobile terminal 3 moves within the Internet 2, the care-of address acquired at the visited site is notified to the home agent 6 located in its home network (such as the subnet 2*a* of FIG. 3), and the packet transfer to the visited site is requested, as specified for the registration processing in Mobile IP (RFC 2002).

Note that Mobile IP protocol as specified in RFC 2002 assumes an existence of a router called foreign agent which carries out packet delivery with respect to the mobile terminal at the visited site network, and provides two modes including a mode for setting an IP address of this foreign agent as the care-of address and a mode called Co-located Care-of address mode in which the foreign agent is not provided (the mobile terminal at the visited site itself plays the role of the foreign agent). The present invention can be realized using either mode.

Note also that in the former mode, the home agent 5 or 6 stores the address of the foreign agent as the care-of address when the mobile terminal moved from the home network. On the other hand, in the latter mode, the home agent 5 or 6 stores an address indicating the current location which is directly allocated to that mobile terminal as the care-of address when the mobile terminal moved from the home network.

Now, when the mobile terminal 3 that has been moving within the private network 1 up until then moves to the Internet 2 side, the home agent 5 of the private network 1 side carries out the processing by regarding the private network side interface address of the packet relay device 4 as the care-of address.

Similarly, when the mobile terminal 3 that has been moving within the Internet 2 up until then moves to the private network 1 side, the home agent 6 of the Internet 2 side carries out the processing by regarding the Internet side interface address of the packet relay device 4 as the care-of address.

Figure 8:
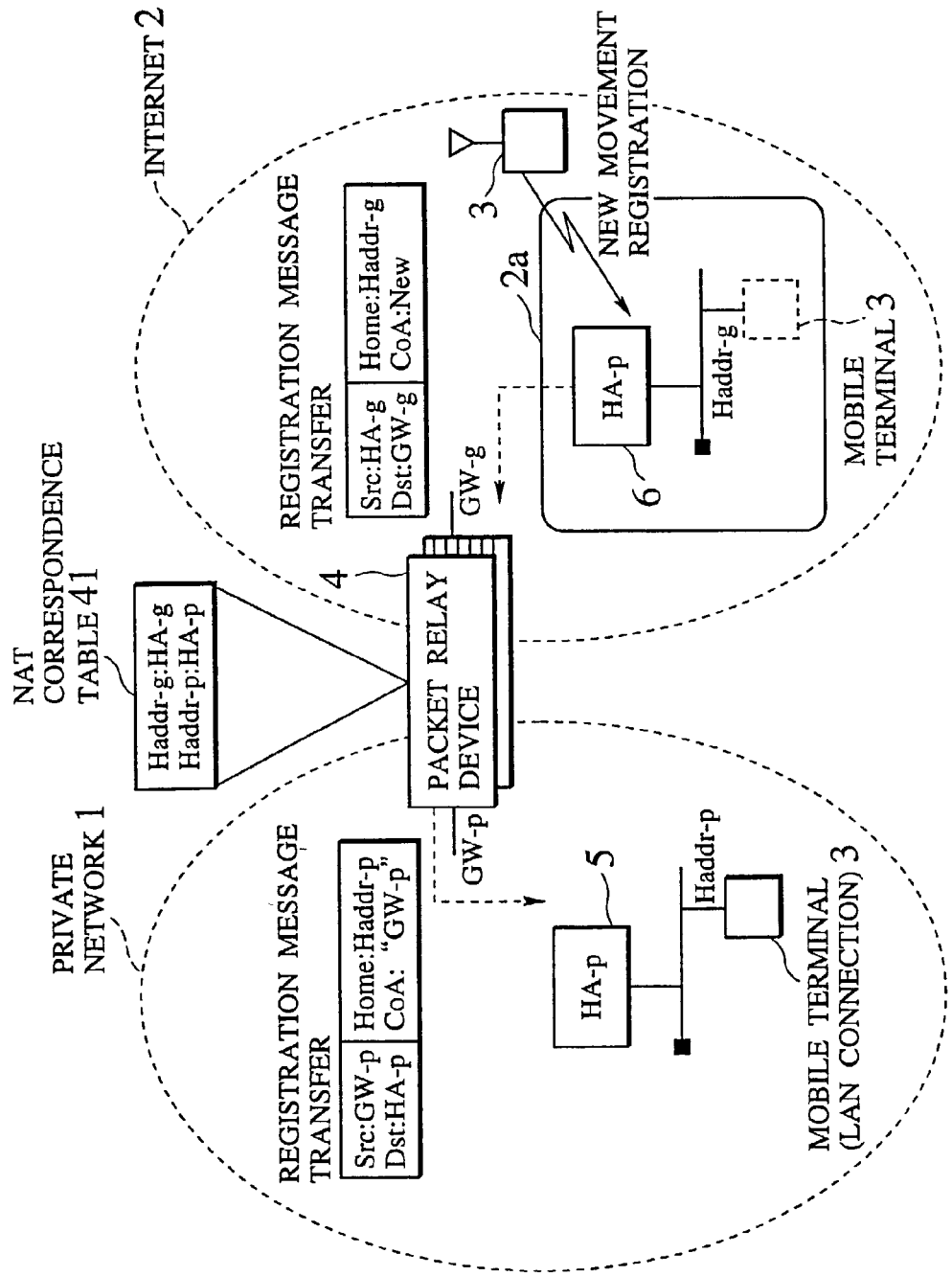
FIG. 8 is a schematic diagram of the communication system of FIG. 3 for explaining a sequence for detecting and processing a movement over networks.

In order to realize such processing at the home agent, it is necessary to carry out the following processing, as shown in FIG. 8.

Namely, when the home agent receives the location registration message from the mobile terminal 3, and detects that this mobile terminal 3 is one that is newly moved into this network. In such a case, the location registration message is transferred to the home agent of the other network by attaching a prescribed identification flag (such as a message type information). Upon receiving this transferred location registration message, the home agent of the other network carries out the usual registration of Mobile IP by setting the interface address of an interface of the packet relay device 4 on that network side as the care-of address.

Figure 9:
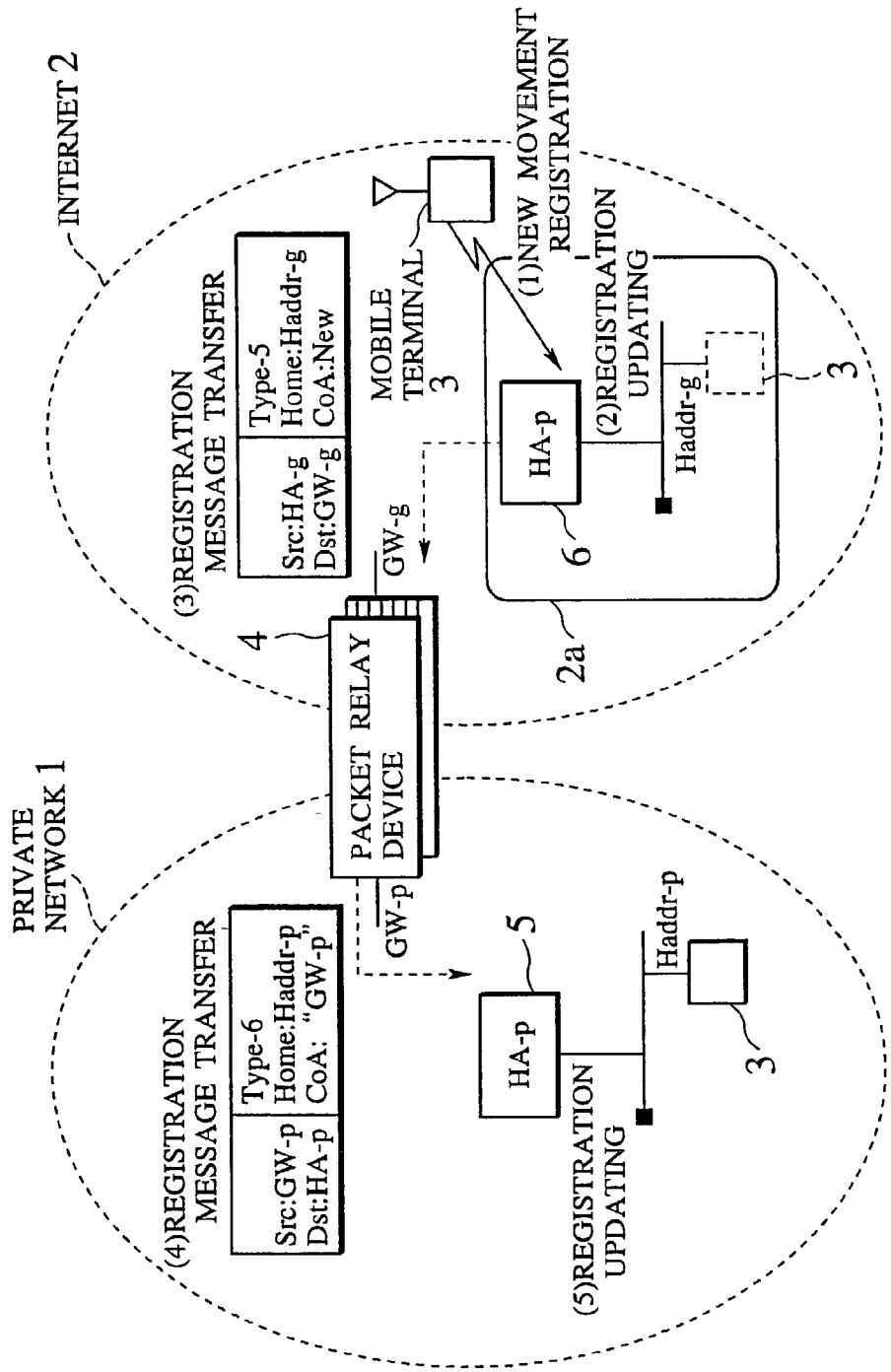
FIG. 9 is a schematic diagram of the communication system of FIG. 3 for explaining a sequence for transferring a location registration message with respect to a movement over networks.

FIG. 9 shows exemplary message format and table updating operation in an exemplary case where some mobile terminal 3 has moved from the private network 1 to the global Internet 2, acquired the care-of address, and then transmitted the registration message of Mobile IP. Here, the operation proceeds as follows.

(1) New movement registration: The usual location registration for setting the home address=Haddr-g and the care-of address=CoA-g is carried out from the mobile terminal 3 with respect to the Internet home agent 6.

(2) Registration updating: The Internet home agent 6 carries out the usual mobility binding generation (sets the care-of address=CoA-g as the bind of the home address Haddr-g).

(3) Registration message transfer: The Internet home agent 6 transfers the registration message to the packet relay device 4 in an own message format. Here, the message Type is assumed to be 5 (MIP-relay).

(4) Registration message transfer: The packet relay device 4 transfers the registration message to the private network home agent 5 by setting Type=6, the home address=Haddr-p, and the care-of address=GW-p, in the case of carrying out the NAT processing. On the other hand, in the case of not carrying out the NAT processing, the packet relay device 4 transfers the same registration message as in the above (3).

(5) Registration updating: The private network home agent 5 updates the bind of Haddr-p to the care-of address=GW-p.

This operation (5) is the same one as what is performed at the time of the pair message registration. However, this registration message have to be sent as the keep-alive message as defined in RFC 2002, so that this operation is actually mandatory and not redundant.

Note that, when the mobile terminal 3 further moves within the Internet 2 after that, the re-registration from the mobile terminal 3 with respect to the Internet home agent 6 will be carried out (by updating the care-of address that is bound to the home address=Haddr-g).

In other words, the private network home agent 5 carries out the data transfer control according to Mobile IP by setting the care-of address of the mobile terminal 3 with Haddr-p as the private address GW-p of the packet relay device 4 on the private network 1 side, while on the Internet 2 side, the Internet home agent 6 carries out the data transfer control according to Mobile IP using the care-of address of the mobile terminal 3 with Haddr-g for packets destined to that mobile terminal 3 which are transferred through a route of: correspondent host→private network home agent 5→packet relay device 4.

Note also that the similar operation and control will be carried out in the case of moving from the Internet 2 to the private network 1.

Here, in order to detect a new movement, it is possible to carry out such a control that each home agent 5 or 6 stores the immediately previous care-of address, judges that it is a new movement into that network 1 or 2 when the address of that network 1 or 2 is not stored as the immediately previous care-of address, and transfers the location registration message to the other home agent 6 or 5 of the other network 2 or 1, for example.

Also, in the case where the mobile terminal 3 moves from the own network 1 or 2 to the other network 2 or 1, there are several optional control methods for the home agent 5 or 6 located in that original network 1 or 2 regarding how long the transfer of packets destined to that mobile terminal 3 that has moved to the other network 2 or 1 should be continued, including the following.

Figure 10:
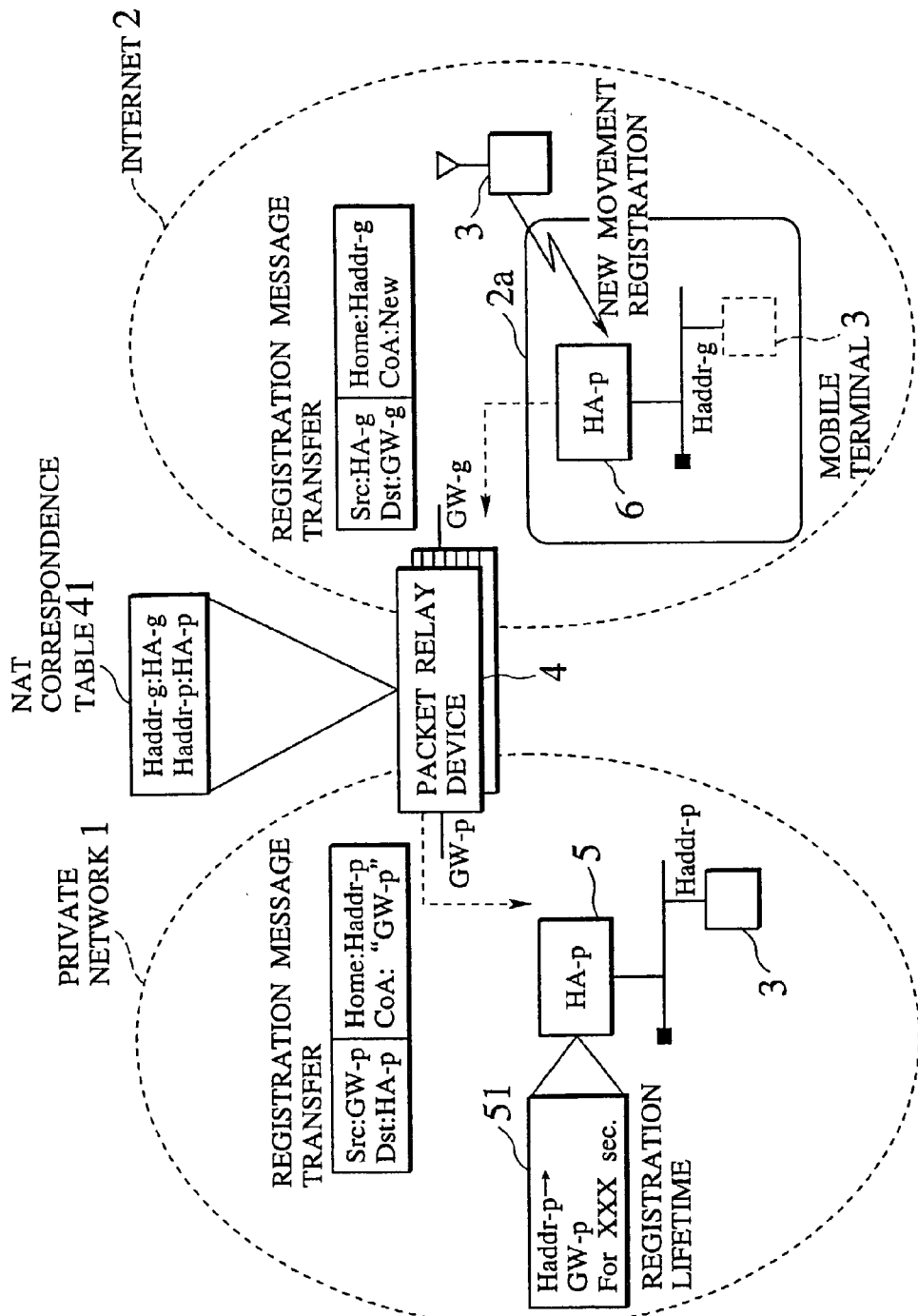
FIG. 10 is a schematic diagram of the communication system of FIG. 3 for explaining one method for stopping packet transfer to a new location after a movement over networks.

As shown in FIG. 10, a special lifetime information 51 is provided for a movement over the networks 1 and 2, and the data transfer to the mobile terminal for which a period set up by this information has expired will be stopped.

Figure 11:
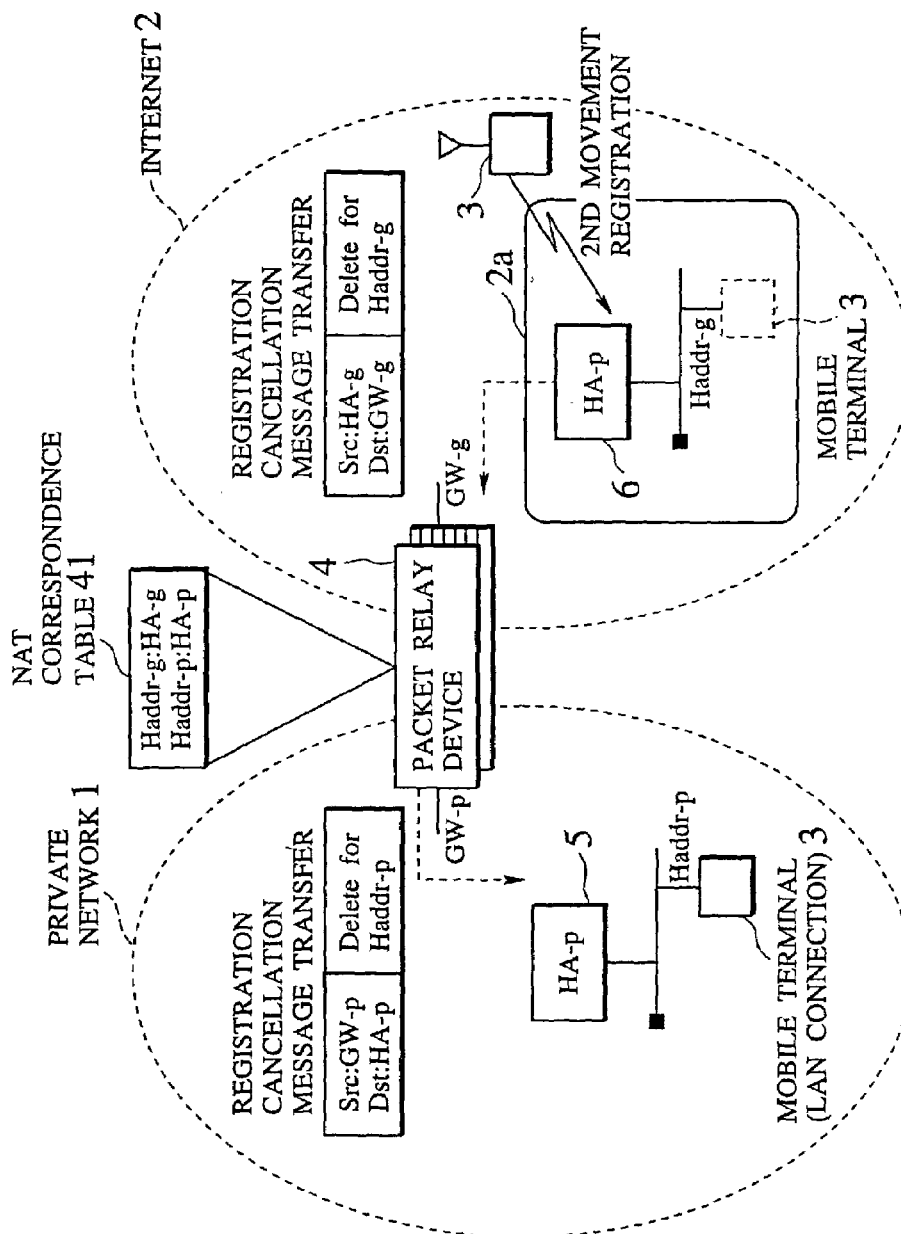
FIG. 11 is a schematic diagram of the communication system of FIG. 3 for explaining another method for stopping packet transfer to a new location after a movement over networks.

As shown in FIG. 11, at a time of carrying out the location registration associated with the moving of the mobile terminal for the second time at the visited site network, a message is transmitted to the home agent of the original network such that the home agent of the original network deletes an entry corresponding to that mobile terminal.

The data transfer for the mobile terminal is supported until the currently executing communication job is finished.

Here, with reference to FIG. 12, the third optional control method will be described in detail.

The advantage of utilizing Mobile IP for the movement between the networks 1 and 2 is that the communication that was started at the previous location can be continued at the new location without disconnecting and re-connecting the connection. Consequently, even for the case of moving over the networks as described above, it is possible to carry out such a control that the packet transfer from the original network to the new network is stopped when the mobile terminal 3 itself recognizes that the communication job (such as the file transfer or telnet) that was started at the original network has been finished completely.

Figure 12:
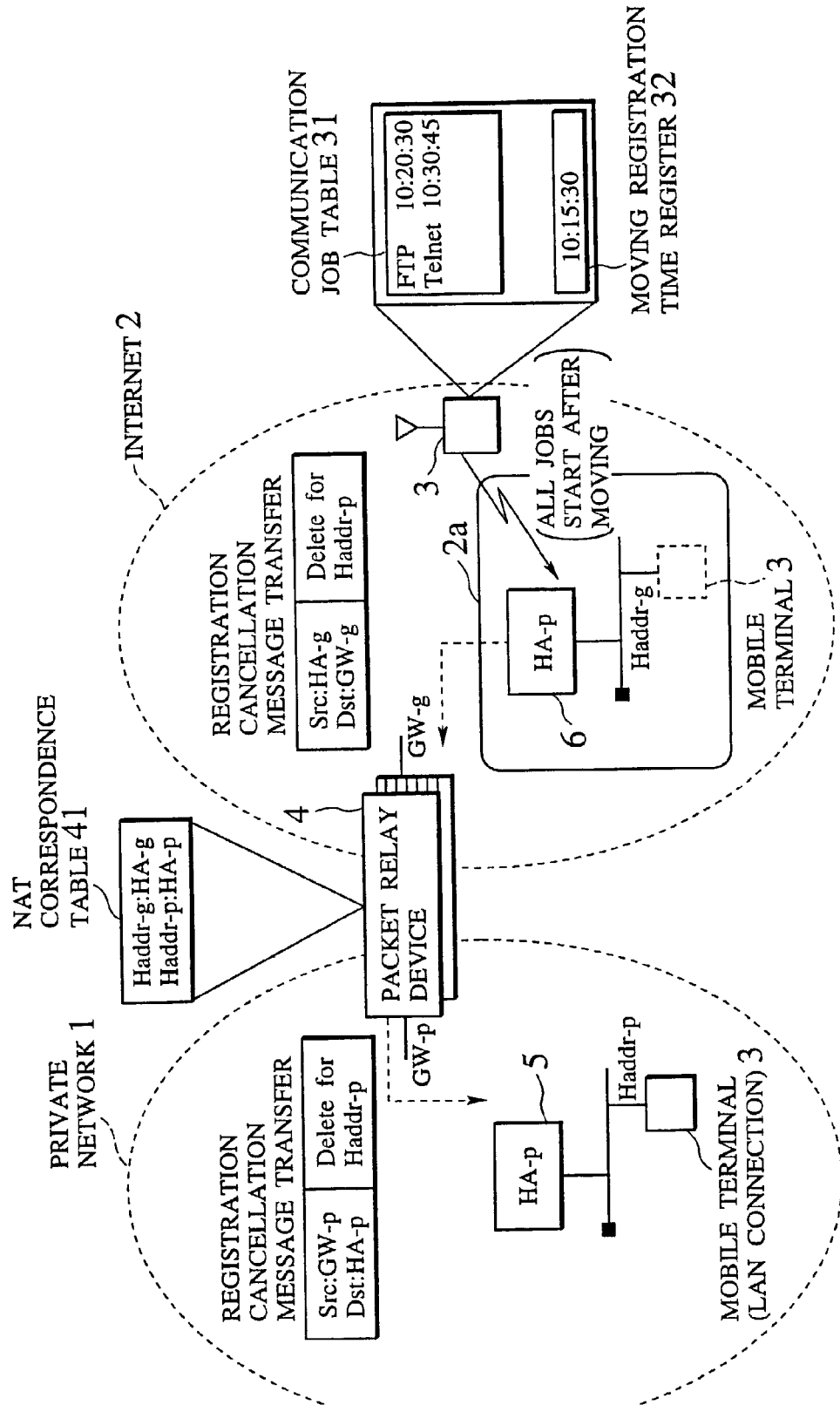
FIG. 12 is a schematic diagram of the communication system of FIG. 3 for explaining still another method for stopping packet transfer to a new location after a movement over networks.

In the example shown in FIG. 12, the mobile terminal 3 internally has a communication job table 31 for indicating when each communication job has been started, and a location registration time register 32 for indicating when the new registration was made at the current location.

The mobile terminal 3 regularly checks the communication job table 31 and the location registration time register 32, and when it is judged that the communication job table 31 contains no communication job that has been started before the moving time indicated by the location registration time register 32, a message is transmitted to the home agent of the previously located network such that the home agent of the previously located network deletes an entry corresponding to that mobile terminal.

Figure 13:
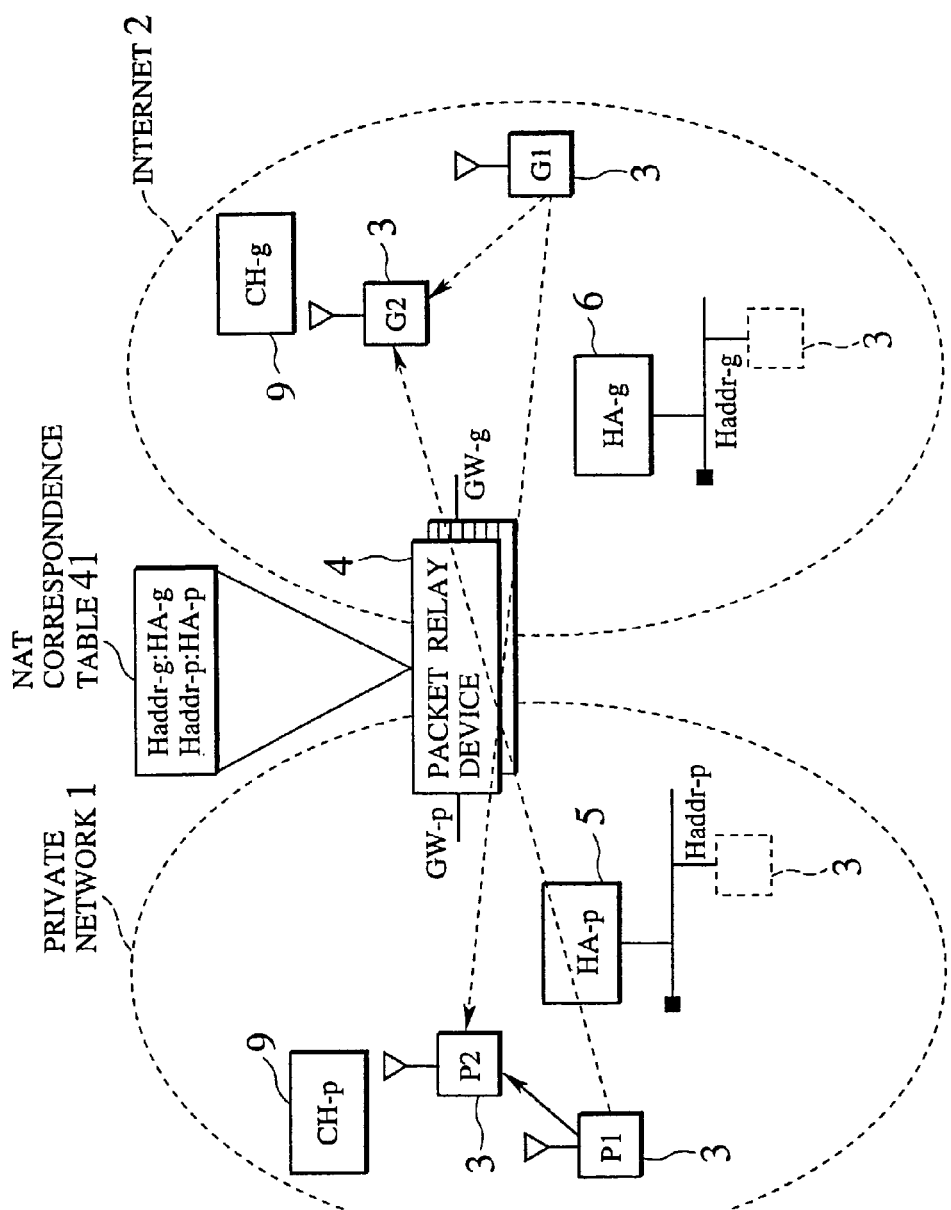
FIG. 13 is a schematic diagram of the communication system of FIG. 3 showing an exemplary configuration used in describing an overall operation.

Now, the controlling procedure at a time of moving of the mobile terminal 3 according to the control method described above will be described for an exemplary case shown in FIG. 13. Here, for the location management in the case of a movement over the networks 1 and 2, the above described scheme for cancelling the transfer from the originating network at a time of the second location registration will be adopted.

Figure 14:
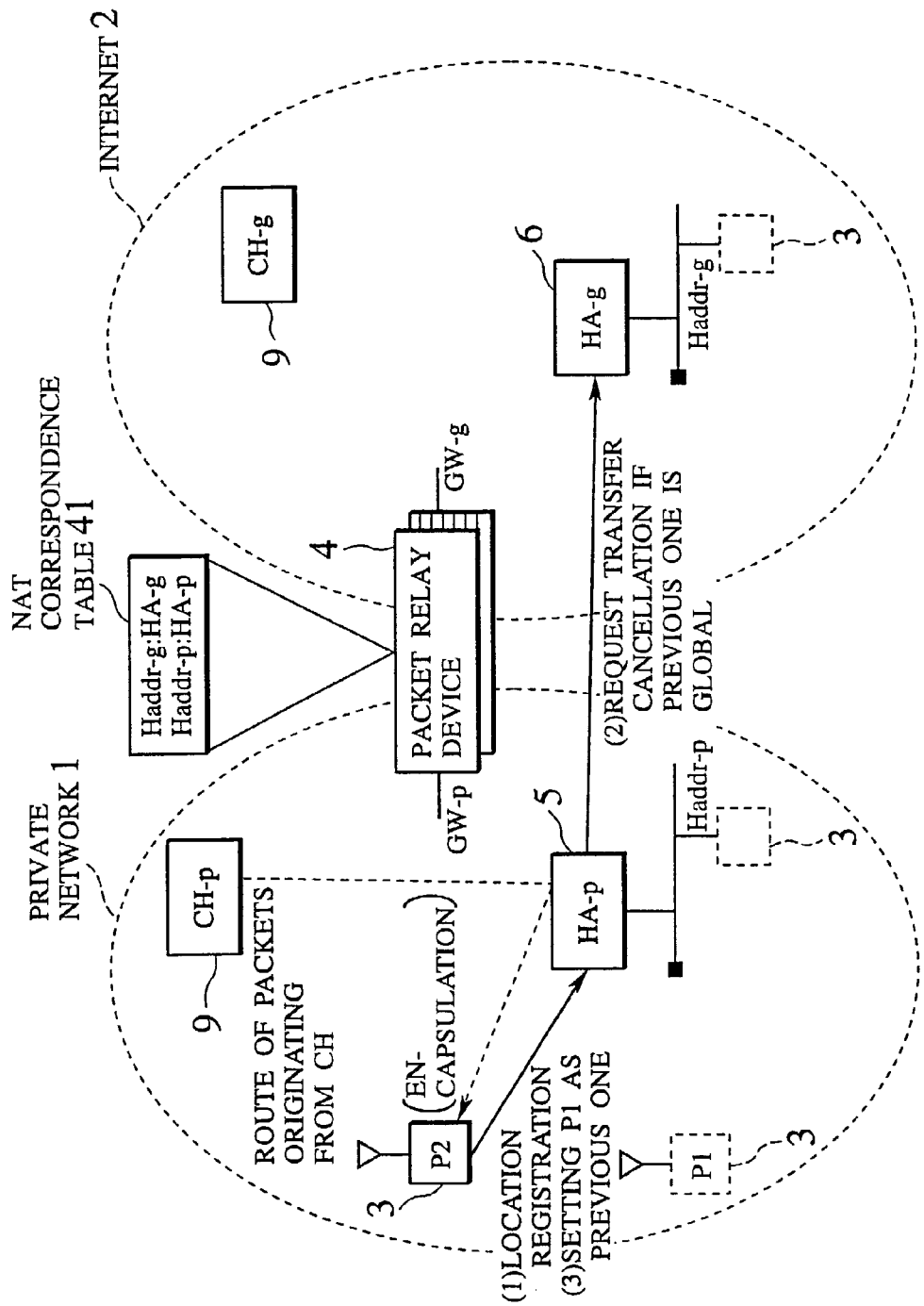
FIG. 14 is a schematic diagram of the communication system of FIG. 13 for explaining a processing in the case where a mobile terminal moves within a private network.

First, with reference to FIG. 14, the movement control (among subnets) within the private network 1 will be described.

When the mobile terminal 3 changes its location from P1 to P2 within the private network 1, the mobile terminal 3 transmits a registration message with P2 as the care-of address, to the private network home agent 5, so as to make a new location registration. Here, if an "immediately previous location" (which is a location immediately before P1 in this case) stored in the private network home agent 5 is an address within the global Internet 2, the private network home agent 5 transmits a message for cancelling the transfer for this mobile terminal 3 with respect to the Internet home agent 6, while changing the "immediately previous location" to P1.

A packet originating from the correspondent node of the mobile terminal 3 is transferred to the subnet of the private network home agent 5 to which Haddr-p belongs, received there by the private network home agent 5 once, encapsulated within a packet destined to P2 according to the scheme specified by Mobile IP, and transferred to a new location.

Figure 15:
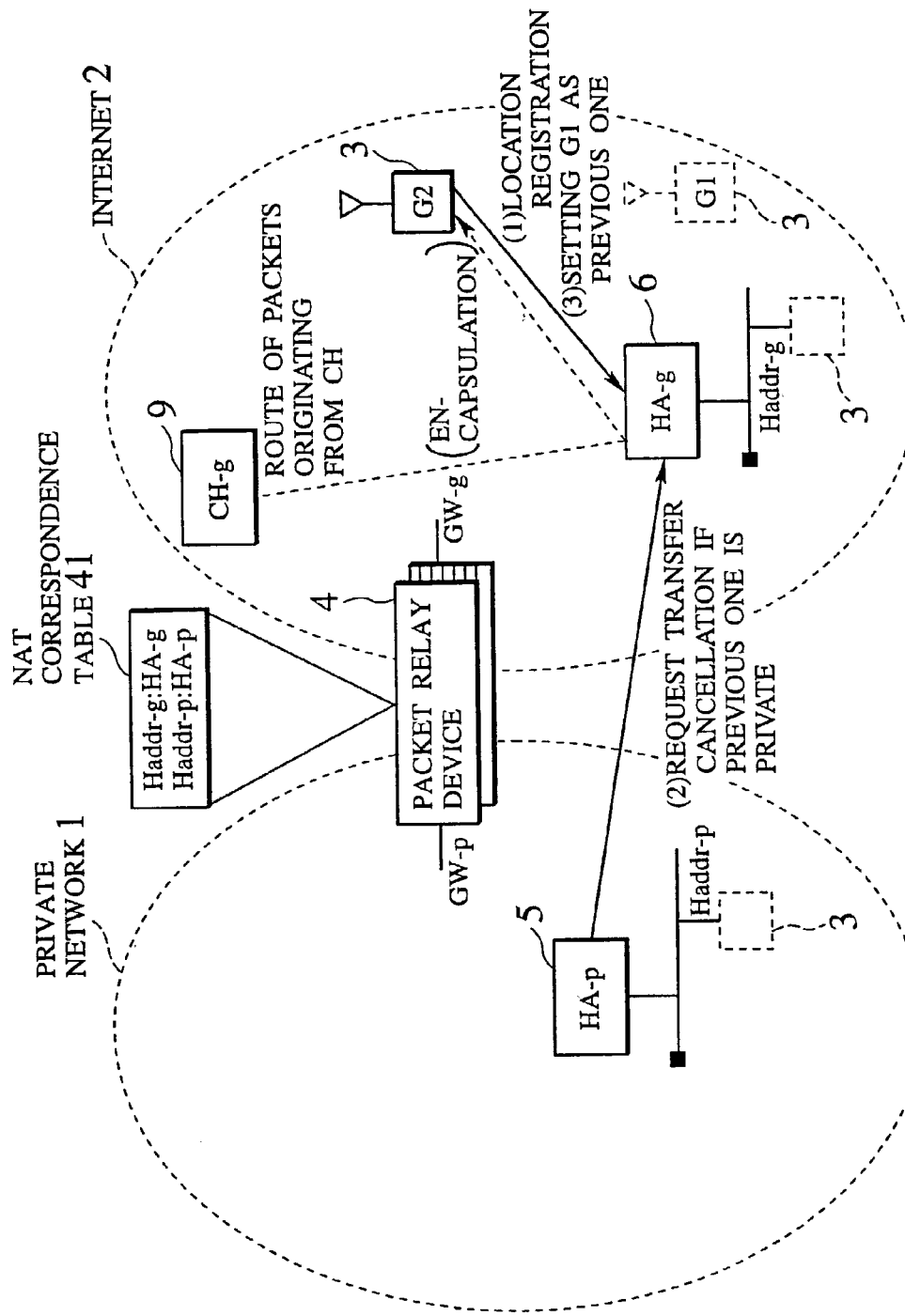
FIG. 15 is a schematic diagram of the communication system of FIG. 13 for explaining a processing in the case where a mobile terminal moves within the Internet.

Next, with reference to FIG. 15, the movement control (among subnets) within the Internet 2 will be described.

When the mobile terminal 3 changes its location from G1 to G2 within the Internet 2, the mobile terminal 3 transmits a registration message with G2 as the care-of address, to the Internet home agent 6, so as to make a new location registration. Here, if an "immediately previous location" (which is a location immediately before G1 in this case) stored in the Internet home agent 6 is an address within the private network 1, the Internet home agent 6 transmits a message for cancelling the transfer for this mobile terminal 3 with respect to the private network home agent 5, while changing the "immediately previous location" to G1.

A packet originating from the correspondent node of the mobile terminal 3 is transferred to the subnet of the Internet home agent 6 to which Haddr-g belongs, received there by the Internet home agent 6 once, encapsulated within a packet destined to G2 according to the scheme specified by Mobile IP, and transferred to a new location.

Figure 16:
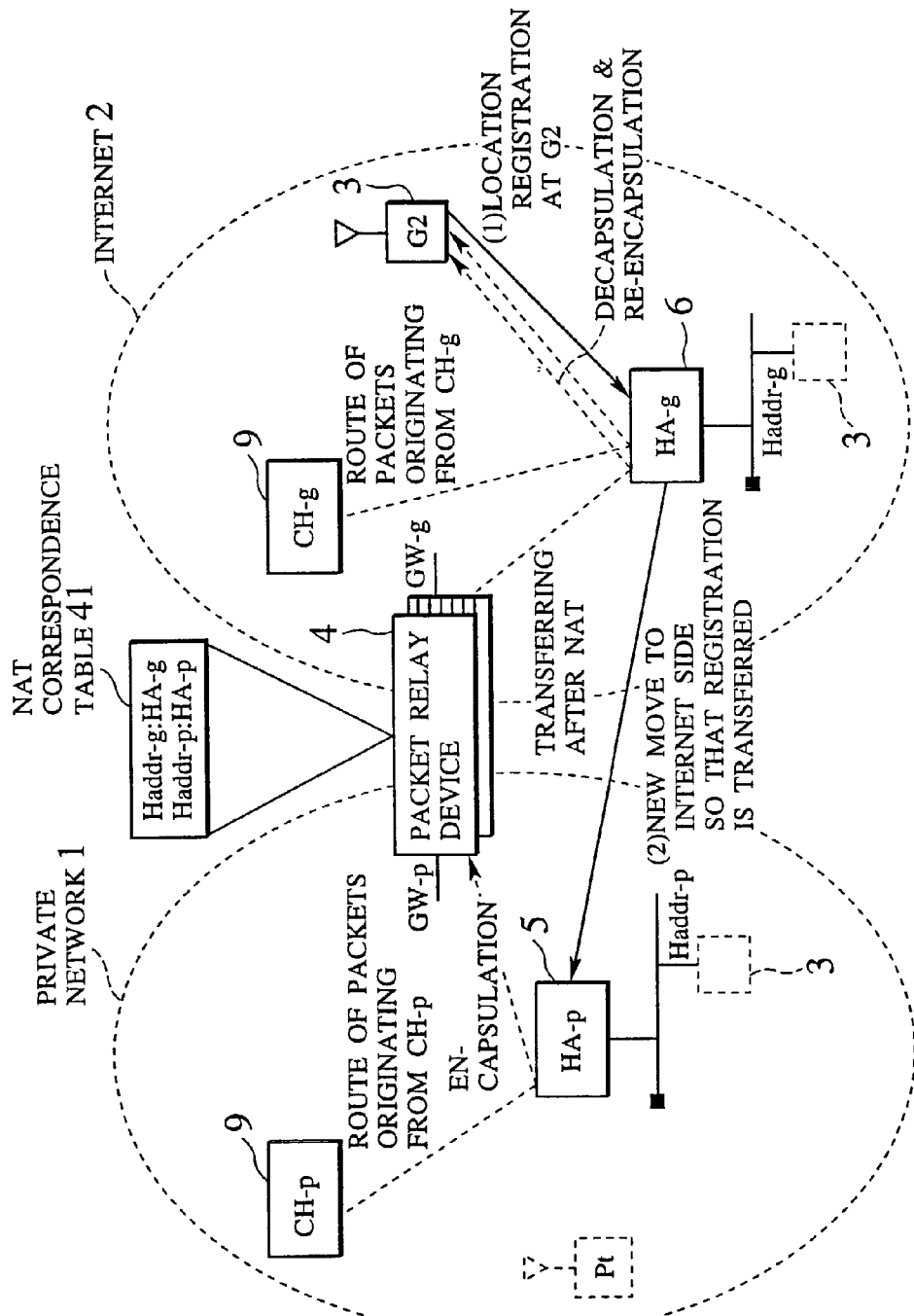
FIG. 16 is a schematic diagram of the communication system of FIG. 13 for explaining a processing in the case where a mobile terminal moves from a private network into the Internet.

Next, with reference to FIG. 16, the movement control in the case of moving from the private network 1 to the Internet 2 will be described.

When the mobile terminal 3 that was located within the private network 1 has moved from P1 to the Internet 2, the mobile terminal 3 first acquires the home address Haddr-g at the Internet 2 side.

If the moving target location is in the same subnet as Haddr-g, it is possible to carry out communications without requiring the routing control of Mobile IP at the Internet 2 side by using Haddr-g directly.

If the mobile terminal 3 changes a location to G2 on a subnet which is different from the DHCP server that has allocated Haddr-g at the Internet 2 side, the mobile terminal 3 transmits a registration message with G2 as the care-of address, to the Internet home agent 6, so as to make a new location registration.

In this case, the Internet home agent 6 does not maintain any bind with respect to this mobile terminal 3, so that it is recognized as a new movement into this Internet 2, and the location registration message is also transferred to the private network home agent 5.

This registration message is transferred as shown in FIG. 9, and upon receiving this registration message, the private network home agent 5 carries out the registration updating by setting GW-p as the care-of address on the private network 1 side.

Also, the packet relay device 4 produces a correspondence table for the home agents of the respective networks (HA-p and HA-g), and carries out the NAT processing when the subsequent packet arrives.

A packet originating from the correspondent node that is located at the Internet 2 side is transferred to the subnet of the Internet home agent 6 to which Haddr-g belongs, received there by the Internet home agent 6 once, encapsulated within a packet destined to G2 according to the scheme specified by Mobile IP, and transferred to a new location.

Also, a packet originating from the correspondent node that is located at the private network 1 side is transferred to the subnet of the private network home agent 5 to which Haddr-p belongs, where Haddr-p is the immediately previous registered address, received there by the private network home agent 5 once, and encapsulated within a packet destined to GW-p according to the scheme specified by Mobile IP. Then, at the packet relay device 4, this packet is then recognized as having HA-p as the source address, NAT processed into the global address packet destined to HA-g, and routing controlled to the Internet home agent 6 on the Internet 2 side. The Internet home agent 6 registers G2 as the care-of address for Haddr-g, so that the transferred packet is decapsulated once, re-encapsulated into a packet destined to G2, and transferred to the current location.

Figure 17:
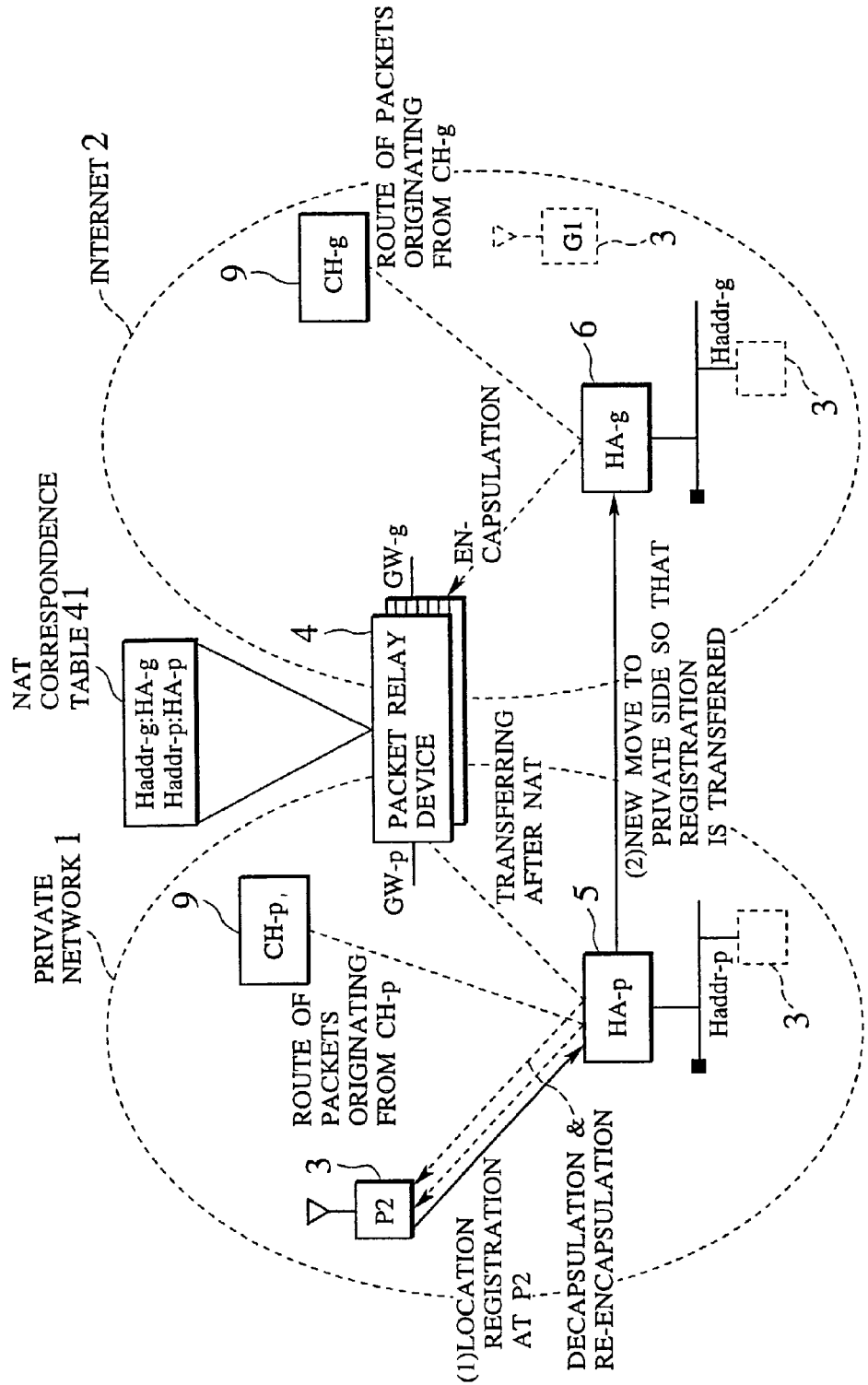
FIG. 17 is a schematic diagram of the communication system of FIG. 13 for explaining a processing in the case where a mobile terminal moves from the Internet into a private network.

Next, with reference to FIG. 17, the movement control in the case of moving from the Internet 2 to the private network 1 will be described.

When the mobile terminal 3 that was located within the Internet 2 has moved from G1 to the private network 1, the mobile terminal 3 first acquires the home address Haddr-p at the private network 1 side.

If the moving target location is in the same subnet as Haddr-p, it is possible to carry out communications without requiring the routing control of Mobile IP at the private network 1 side by using Haddr-p directly.

If the mobile terminal 3 changes a location to P2 on a subnet which is different from the DHCP server that has allocated Haddr-p at the private network 1 side, the mobile terminal 3 transmits a registration message with P2 as the care-of address, to the private network home agent 5, so as to make a new location registration.

In this case, the private network home agent 5 does not maintain any bind with respect to this mobile terminal 3, so that it is recognized as a new movement into this private network 1, and the location registration message is also transferred to the Internet home agent 6.

This registration message is transferred similarly as shown in FIG. 9, and upon receiving this registration message, the Internet home agent 6 carries out the registration updating by setting GW-g as the care-of address on the Internet 2 side.

Also, the packet relay device 4 produces a correspondence table for the home agents of the respective networks (HA-p and HA-g), and carries out the NAT processing when the subsequent packet arrives.

A packet originating from the correspondent node that is located at the private network 1 side is transferred to the subnet of the private network home agent 5 to which Haddr-p belongs, received there by the private network home agent 5 once, encapsulated within a packet destined to P2 according to the scheme specified by Mobile IP, and transferred to a new location.

Also, a packet originating from the correspondent node that is located at the Internet 2 side is transferred to the subnet of the Internet home agent 6 to which Haddr-g belongs, where Haddr-g is the immediately previous registered address, received there by the Internet home agent 6 once, and encapsulated within a packet destined to GW-g according to the scheme specified by Mobile IP. Then, at the packet relay device 4, this packet is then recognized as having HA-g as the source address, NAT processed into the private address packet destined to HA-p, and routing controlled to the private network home agent 5 on the private network 1 side. The private network home agent 5 registers P2 as the care-of address for Haddr-p, so that the transferred packet is decapsulated once, re-encapsulated into a packet destined to P2, and transferred to the current location.

Note that, in the above described scheme, when the mobile terminal leaves the private network or Internet once and then returns to that private network or Internet again, it is assumed that the home address different from that used before leaving that network once will be allocated, but if necessary, it is also possible to control such that the allocated address is stored at the DHCP server side and the fixed address is always given to a specific host as the home address. It is also possible to realize the control in which the fixed address allocation is limited within a prescribed period of time.

Now, the above described packet transfer scheme is applied to a movement over the global network and the private network, but this scheme can be extended to support a movement over a plurality of private networks which are connected to the Internet at different points, provided that there is no overlap in addresses among the private networks.

Figure 18:
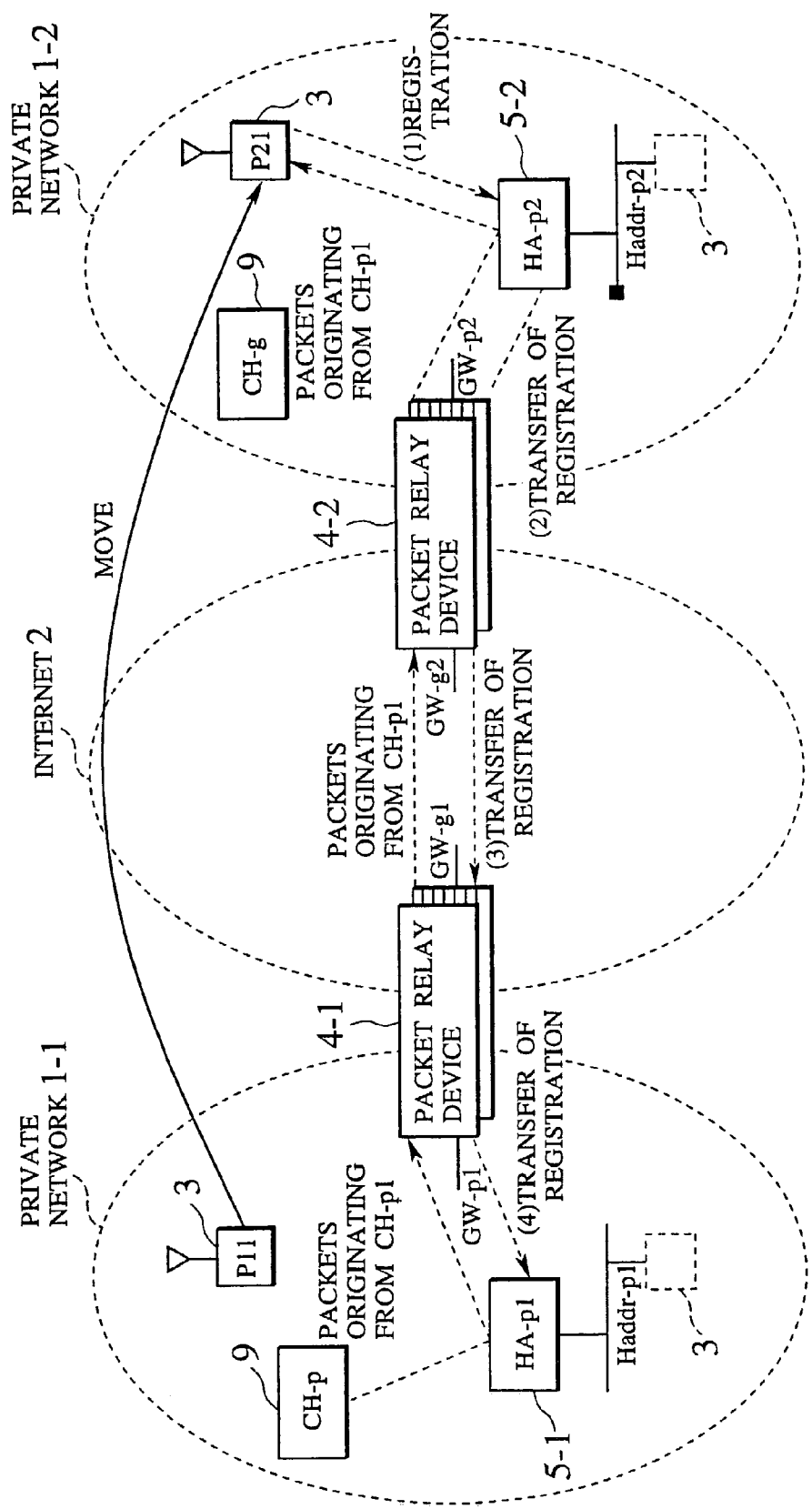
FIG. 18 is a schematic diagram of the communication system of FIG. 3 showing another exemplary configuration in which a mobile terminal moves over a plurality of private networks.

FIG. 18 shows an exemplary network configuration for such a case, where the first private network 1-1 and the second private network 1-2 are individually connected to the Internet 2.

Here, suppose that the mobile terminal 3 has moved from a location of the address P11 in the private network 1-1 to a location of the address P21 in the private network 1-2. In this case, the mobile terminal 3 acquires the home address Haddr-P2 at the private network 1-2, and carries out the registration of this home address Haddr-P2 using P21 as the care-of address with respect to the home agent 5-2 (which is assumed to have an address HA-p2).

Also, P11 is the immediately previous location, so that the location registration message is also transferred to the home agent 5-1 (which is assumed to have an address HA-p1) that had been used in the private network 1-1, in a form of a registration transfer message which is obtained by attaching appropriate flag information to the location registration message. In this case, the home agent 5-2 in the private network 1-2 transfers the registration transfer message, but the private network 1-1 and the private network 1-2 are independent managed so that it is difficult to carry out the routing control from the private network 1-2 to the private network 1-1 directly. For this reason, the home agent 5-2 transmits the registration transfer message to the packet relay device 4-2 by explicitly describing the destination private network to which the registration message is to be transferred. The packet relay device 4-2 checks this destination network description, and judges that this registration transfer message is to be transferred to the private network 1-1 through the packet relay device 4-1.

Note here that, in the case of moving across a plurality of private networks as in this example, it is cumbersome to identify the mobile terminal by its address on one network, and it is easier to identify the terminal that is carrying out the moving operation by using an identifier unique to that terminal. Namely, an ID of this mobile terminal can be attached to the registration message and the registration transfer message such that the necessary table search can be realized faster by using this ID.

Thus the packet relay device 4-2 sends the registration transfer message to the packet relay device 4-1, and the packet relay device 4-1 ascertains that this registration transfer message is to be transferred to the home agent 5-1 of the address HA-p1 according to the mobile terminal ID contained therein and transfers this registration transfer message accordingly.

The home agent 5-1 then recognizes that the mobile terminal 3 has now moved to the private network 1-2, and adds an information indicating this fact as the bind information of the mobile terminal 3.

When the registration message is transferred to the home agent 5-1 in this way, a packet originating from the correspondent host within the private network 1-1 is transferred to the subnet of the home agent 5-1 in the private network 1-1, received there by the home agent 5-1 once, encapsulated within a packet destined to the private network 1-2 according to the scheme specified by Mobile IP, and transferred. Here, the encapsulated packet also has the ID of the mobile terminal 3 attached thereto, and the selection of appropriate home agent is carried out at the private network 1-2 side by using this mobile terminal ID.

Upon receiving this packet, the packet relay device 41 recognizes that it is a packet to be transferred from the private network 1-1 to the private network 1-2, and transfers this packet as it is to the address GW-g2 of the private network 1-2.

The packet relay device 4-2 applies the NAT processing to the transferred encapsulated packet, and ascertains that this packet is to be transferred to the home agent 5-2 on the private network 1-2 side according to the mobile terminal terminal ID attached to the encapsulated packet, and routing controls this packet to the home agent 5-2.

The home agent 5-2 on the private network 1-2 side registers the P21 as the care-of address for Haddr-P2, so that the transferred packet is decapsulated once, re-encapsulated into a packet destined to P21, and transferred to the current location.

In this way, the present invention can be easily expanded or modified even in the case where the mobile terminal moves among a plurality of private networks which are separately connected to the Internet.

Note that, when a plurality of private networks exist, these private networks can be distinguished from each other by modifying the above described processing with respect to the private address into a processing with respect to a set of the private address and an identifier of the private network which allocated that private address.

Figure 19:
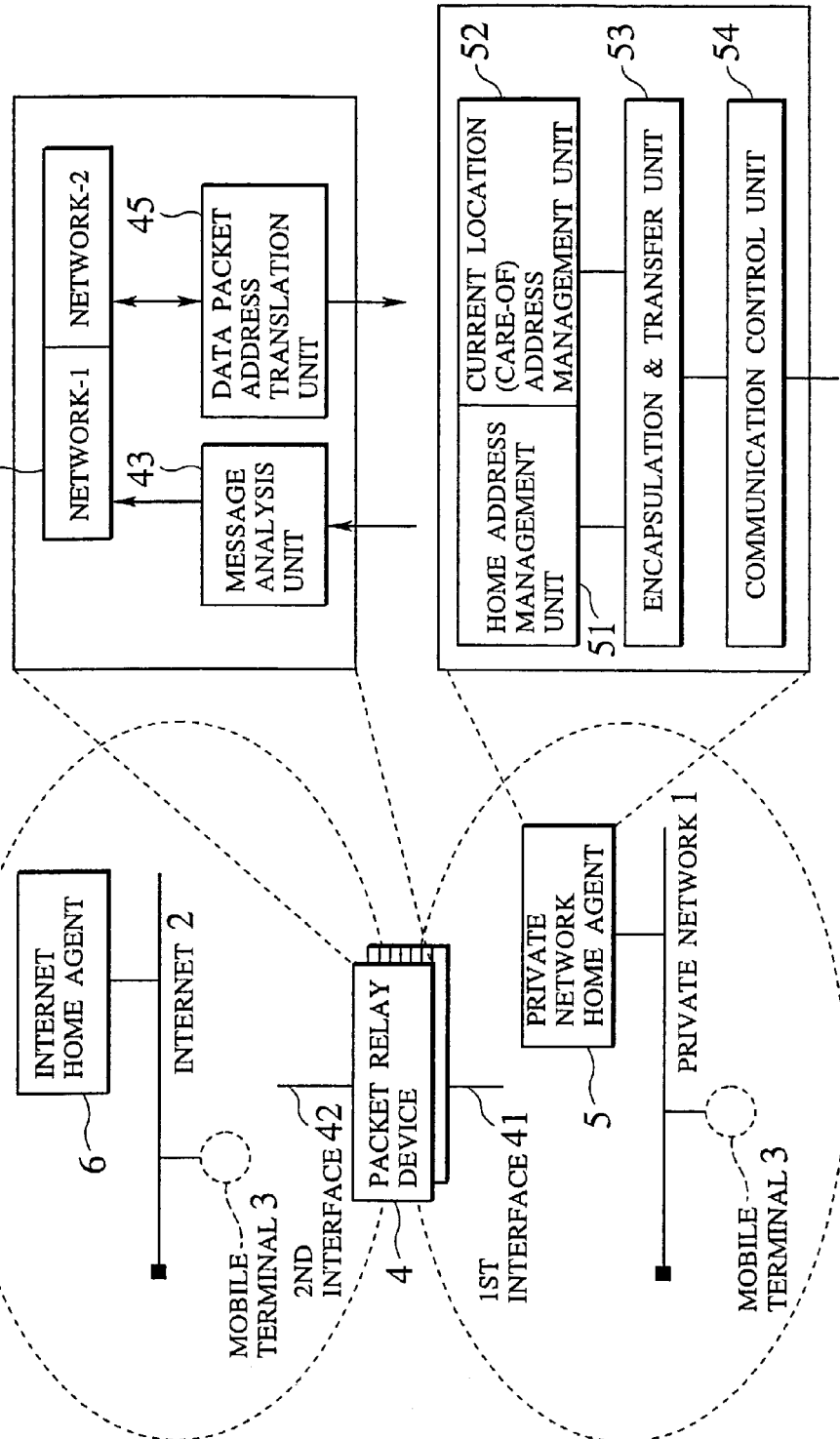
FIG. 19 is a schematic diagram of the communication system of FIG. 3 showing exemplary internal configurations of a packet relay device and a home agent.

In order to realize the above described functions of the present invention, the packet relay device 4 and the home agent 5 or 6 can have configurations as shown in FIG. 19.

Namely, the packet relay device 4 can comprise a first interface 41 on the private network 1 side, a second interface 42 on the Internet 2 side, a message analysis unit 43 for analyzing a received message, an address correspondence table 44 for storing a correspondence of an address on the private network 1 side and an address on the Internet 2 side, and a data packet address translation unit 45 for applying the NAT processing to a data packet to be transferred.

Also, the home agent 5 can comprise a home address management unit 51 for managing the home address of the mobile terminal 3, a current location address management unit 52 for managing the current location address of the mobile terminal 3, an encapsulation and transfer unit 53 for transferring packets by encapsulating them appropriately, and a communication control unit 54 for controlling communications. The home agent 6 can have the similar configuration.

Now, as described above, in the conventional Mobile IP scheme, the mobile terminal is permitted to move only within a network operated by a single address space in which the reacheability with respect to its home network is guaranteed. Consequently, when the communication service provider manages the private network operated by the private addresses and provides data communication service with respect to the mobile terminal using radio links within that private network, if this mobile terminal carries out communications by moving to the global Internet external to that private network, it is impossible to realize the movement management of the mobile terminal that moves across a plurality of address spaces because of the above noted limitation of Mobile IP specification.

In such a case, it is necessary to account for two types of address spaces used by the private network operated by the private addresses and managed by the communication service provider and the general global Internet, comprehend which address space the mobile terminal is currently located, and gives the location information to an appropriate movement management router such that the routing control for packets can be realized properly across the border between the networks. In particular, when the mobile terminal moves across the border between the networks, there is a need to provide a mechanism for realizing the routing control of packets properly from a previous location to a current location.

According to the present invention, the location management router (home agent) for managing the current location of the mobile terminal and transferring packets destined to the home address of the mobile terminal to the current location of the mobile terminal is provided at each one of the private network and the Internet which accommodate the mobile terminal, and the current location information of the mobile terminal that moves over the networks is managed by the cooperation of these location management routers, and the transfer to the current location is realized by the cooperation of these location management routers and the packet relay (gateway) device, such that the packets can be properly routing controlled to the current location regardless of whether the server to which the mobile terminal makes an access is on the private network side or the Internet side, and and regardless of whether the correspondent host of the mobile terminal is located at the private network side or the Internet side. Also, even when the mobile terminal moves across the border between the networks during the communication, the packets can be properly routing controlled to the current location without interrupting the communication. Of course, the movement of the mobile terminal within each network can also be supported.

Also, by applying the datagram transfer method of the present invention, it is also possible to support the roaming in which the mobile terminal moves over a plurality of private networks which are independently operated by a plurality of communication service providers.

Also, the management of communication state logs and the management of charges with respect to mobile users can be made easier, and the expansion in the case of incorporating the other control mechanism such as fire wall at the border of the Internet can also be made easier.

Note that the present invention is also applicable to the mobile communication protocol other than Mobile IP so as to make it possible to support the moving across a plurality of address spaces.

Note also that the present invention is equally applicable to the cases where the Internet used in the above described embodiments is replaced by a private network having another address space.

Note also that the present invention is also applicable to the case of using a terminal having a radio interface which changes its location on the network while carrying out communications.

For example, the present invention can be applied to the roaming between the enterprise network and the radio communication service provider (radio ISP, that is, Internet service provider having a radio access network). In this case, suppose that the enterprise network uses the private address management while the radio communication service provider uses the global address management. Then, the Internet 2 of the above embodiments is a network of the radio ISP, and subnets within the Internet 2 are subnets at which addresses are initially allocated by the radio ISP, i.e., subnets with access servers, for example. On the other hand, the private network 1 of the above embodiments is the enterprise network of a particular company, and subnets within the private network 1 are subnets of different sections within that particular company, for example. The Internet home agent 6 is a home agent provided at an access server subnet by the radio ISP, while the private network home agent 5 is a home agent provided by that particular company, and the packet relay device 4 is a gateway device of that particular company.

As another example, the present invention cam also be applied to the roaming between a plurality of radio communication service providers. In this case, suppose that a radio ISP (A) uses the private address management while another radio ISP (B) uses the global address management, and their uses can roam through their networks. Then, the Internet 2 of the above embodiments is a network of the radio ISP (B) and subnets within the Internet 2 are subnets at which users initially enter into the radio ISP (B) and get addresses allocated. On the other hand, the private network 1 of the above embodiment is a network of the radio ISP (A) and subnets within the private network 1 are subnets at which addresses are initially allocated by the radio ISP (A), i.e., subnets with access servers. The Internet home agent 6 is a home agent provided at each subnet by the radio ISP (B), while the private network home agent 5 is a home agent provided by the radio ISP (A), and the packet relay device 4 is a gateway device of the radio ISP (A).

In the above examples, movements among subnets of the radio ISP (the base station switching processing (handoff) during communications with a radio base station) can be supported by the radio datalink layer rather than the network layer.

It is to be noted that the above described embodiment according to the present invention may be conveniently implemented in forms of software programs for realizing the operations of the packet relay device and the home agent, as will be apparent to those skilled in the computer art. Appropriate software coding can readily be prepared by skilled programmers based on the teachings of the present disclosure, as will be apparent to those skilled in the software art.

In particular, each one of the entire packet relay device and the entire home agent as described above can be conveniently implemented in a form of a software package. Such a software program can be provided in a form of a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A communication system for supporting data packet transfer with respect to mobile terminals capable of carrying out communications while moving among networks, in a first network and a second network which are operated by mutually different address systems and which are capable of accommodating the mobile terminals, the communication system comprising;
   a packet relay device having a first interface directly connected with the first network and a second interface directly connected with the second network;
   a first router device provided at a first subnet in the first network, having a function for transferring packets destined to a home address of each mobile terminal belonging to the first subnet to a care-of address of each mobile terminal; and
   a second router device provided at a second subnet in the second network;
   wherein when a mobile terminal has moved from the first network to the second network, the first router device transfers packets destined to an original home address on the first subnet of the mobile terminal by setting an address of the first interface of the packet relay device as a care-of address of the mobile terminal on the first network, the packet relay device transfers the packets received from the first router device at the first interface to the second router device through the second interface, and the second router device transfers the packets received from the packet relay device to a current location address of the mobile terminal on the second network; and
   when the mobile terminal has further moved from the second subnet to a third subnet within the second network, the second router device registers a new care-of address on the third subnet of the mobile terminal upon receiving a mobility registration message from the mobile terminal, and transfers the packets received from the packet relay device by setting the new care-of address as the current location address of the mobile terminal.

2. A communication system for supporting data packet transfer with respect to mobile terminals capable of carrying out communications while moving among networks, in a first network and a second network which are operated by mutually different address systems and which are capable of accommodating the mobile terminals, the communication system comprising:
   a packet relay device having a first interface directly connected with the first network and a second interface directly connected with the second network;
   a first router device provided at a first subnet in the first network, having a function for transferring packets destined to a home address of each mobile terminal belonging to the first subnet to a care-of address of each mobile terminal; and
   a second router device provided at a second subnet in the second network;
   wherein when a mobile terminal has moved from the first network to the second network, the first router device transfers packets destined to an original home address on the first subnet of the mobile terminal by setting an address of the first interface of the packet relay device as a care-of address of the mobile terminal on the first network, the packet relay device transfers the packets received from the first router device at the first interface to the second router device through the second interface, and the-second router device transfers the packets received from the packet relay device-to a current location address of the mobile terminal on the second network;

the second router device transfers a mobility registration message received from the mobile terminal to the first router device via the packer relay device when the second router device judges that the mobile terminal has newly moved into the second network from the first network, and the first router device sets the address of the first interface of the packet relay device as the care-of address of the mobile terminal identified by the mobility registration message transferred from the second router device via the packet relay device; and the second router device stores an immediately previous care-of address of the mobile terminal, and judges that the mobile terminal has newly moved into the second network from the first network when the immediately previous care-of address is an address on the first network.

3. A communication system for supporting data packet transfer with respect to mobile terminals capable of carrying out communications while moving among networks, in a first network and a second network which are operated by mutually different address systems and which are capable of accommodating the mobile terminals, the communication system comprising:

a packet relay device having a first interface directly connected with the first network and a second interface directly connected with the second network;

a first router device provided at a first subnet in the first network, having a function for transferring packets destined to a home address of each mobile terminal belonging to the first subnet to a care-of address of each mobile terminal; and a second router device provided at a second subnet in the second network;

wherein when a mobile terminal has moved from the first network to the second network, the first router device transfers packets destined t o an original home address on the first subnet of the mobile terminal by setting an address of the first interface of the packet relay device as a care-of address of the mobile terminal on the first network, the packet relay device transfers the packets received from the first router device at the first interface to the second router device through the second interface, and the second router device transfers the packets received from the packet relay device to a current location address of the mobile terminal on the second network;

the first router device includes:

a first management unit for managing-the original home address of the mobile terminal;

a second management unit for managing the care-of address of the mobile terminal; and a transfer unit for receiving the packets destined to the original home address managed by the first management unit on behalf of the mobile terminal, and transferring the packets to the care-of address managed by the second management unit, when the mobile terminal is currently not located at the original home address; and when the mobile terminal has moved from the first subnet to another subnet within the first network, the second management unit stores an address of another router device for relaying the packets which is provided for said another subnet or an address allocated to the mobile terminal in said another subnet as the care-of address.

4. A communication system for supporting data packet transfer with respect to mobile terminals capable of carrying out communications while moving among networks, in a first network and a second network which are operated by mutually different address systems and which are capable of accommodating the mobile terminals, the communication system comprising:

a packet relay device having a first interface directly connected with the first network and a second interface directly connected with the second network;

a first router device provided at a first subnet in the first network, having a function for transferring packets destined to a home address of each mobile terminal belonging to the first subnet to a care-of address of each mobile terminal; and a second router device provided at a second subnet in the second network;

wherein when a mobile terminal has moved from the first network to the second network, the first router device transfers packets destined to an original home address on the first subnet of the mobile terminal by setting an address of the first interface of the packet relay device as a care-of address of the mobile terminal on the first network, the packet relay device transfers the packets received from the first router device at the first interface to the second router device through the second interface, and the second router device transfers the packets received from the packet relay device to a current location address of the mobile terminal on the second network;

the first router device includes a first management unit for managing the original home address of the mobile terminal;

a second management unit for managing the care-of address of the mobile terminal; and a transfer unit for receiving the packets destined to the original home address managed by the first management unit on behalf of the mobile terminal, and transferring the packets to the care-of address managed by the second management unit, when the mobile terminal is currently not located at the original home address; and when the mobile terminal has moved from the first subnet to the second subnet, the second management unit stores the address of the first interface of the packet relay device as the care-of address.

5. A communication system for supporting data packet transfer with respect to mobile-terminals capable of carrying out communications while moving among networks in a first network and a second network which are operated by mutually different address systems and which are capable of accommodating the mobile terminals, the communication system comprising:

a packet relay device having a first interface directly connected with the first network and—a second interface directly connected with the second network;

a first router device- provided at a first subnet in the first network, having a function for transferring packets destined to a home address of each mobile terminal belonging to the first subnet to a care-of address of each mobile terminal; and a second router device provided at a second subnet in the second network;

wherein when a mobile terminal has moved from the first network to the second network, the first router device transfers packets destined to an original home address on the first subnet of the mobile terminal by setting an address of the first interface of the packet relay device as a care-of address of the mobile terminal on the first network, the packet relay device transfers the packets received from the first router device at the first interface to the second router device through the second interface, and the second router device transfers the packets received from the packet relay device to a current location address of the mobile terminal on the second network;

when the mobile terminal moves to the second subnet, the mobile terminal acquires a new home address on the second subnet and notifies a pair information on the original home address and the new home address to the packet relay device, and the packet relay device includes:

a message analysis unit for obtaining a correspondence between the original home address and the new home address along with information on the first and second router devices, by analyzing the pair information transferred from the mobile terminal; and an address translation unit for translating a receiving interface side address contained in a packet from one of the first interface and the second interface into a corresponding transmitting interface side address according to the correspondence obtained by the message analysis unit, at a time of transferring the packet to another one of the first interface and the second interface.

* * * * *